(12) United States Patent
Stoytchev

(10) Patent No.: US 11,239,564 B1
(45) Date of Patent: Feb. 1, 2022

(54) CO-LOCATED DIPOLES WITH MUTUALLY-ORTHOGONAL POLARIZATION

(71) Applicant: Airgain Incorporated, San Diego, CA (US)

(72) Inventor: Marin Stoytchev, San Diego, CA (US)

(73) Assignee: Airgain, Inc., San Diego, CA (US)

( * ) Notice: Subject to any disclaimer, the term of this patent is extended or adjusted under 35 U.S.C. 154(b) by 0 days.

(21) Appl. No.: 16/730,645

(22) Filed: Dec. 30, 2019

Related U.S. Application Data

(60) Provisional application No. 62/788,840, filed on Jan. 5, 2018.

(51) Int. Cl.
| | | |
|---|---|---|
| *H01Q 9/28* | (2006.01) |
| *H01Q 9/06* | (2006.01) |
| *H04L 1/00* | (2006.01) |
| *H01Q 13/20* | (2006.01) |
| *H01Q 21/24* | (2006.01) |
| *H01Q 9/32* | (2006.01) |

(52) U.S. Cl.
CPC ............ *H01Q 9/285* (2013.01); *H01Q 9/065* (2013.01); *H01Q 9/32* (2013.01); *H01Q 13/203* (2013.01); *H01Q 21/24* (2013.01); *H04L 1/0048* (2013.01)

(58) Field of Classification Search
CPC ...... H01Q 9/285; H01Q 13/203; H01Q 21/24; H01Q 25/001; H01Q 5/48; H01Q 19/108; H01Q 1/38; H01Q 21/062; H01Q 21/245; H01Q 9/065; H01Q 5/47; H01Q 5/50; H01Q 9/265; H04L 1/0048
See application file for complete search history.

(56) References Cited

U.S. PATENT DOCUMENTS

| | | | |
|---|---|---|---|
| 5,966,102 A * | 10/1999 | Runyon | ................. H01Q 1/246 343/797 |
| D418,142 S | 12/1999 | Thill | |
| 6,087,990 A | 7/2000 | Thill et al. | |
| 6,850,191 B1 | 2/2005 | Thill et al. | |
| 7,061,437 B2 | 6/2006 | Lin et al. | |
| 7,148,849 B2 | 12/2006 | Lin | |
| 7,215,296 B2 | 5/2007 | Abramov et al. | |
| D546,821 S | 7/2007 | Oliver | |
| D549,696 S | 8/2007 | Oshima et al. | |
| 7,333,067 B2 | 2/2008 | Hung et al. | |
| 7,336,959 B2 | 2/2008 | Khitrik et al. | |
| D573,589 S | 7/2008 | Montgomery et al. | |
| 7,405,704 B1 | 8/2008 | Lin et al. | |
| 7,477,195 B2 | 1/2009 | Vance | |
| D592,195 S | 5/2009 | Wu et al. | |
| 7,570,215 B2 | 8/2009 | Abramov et al. | |
| D599,334 S | 9/2009 | Chiang | |

(Continued)

*Primary Examiner* — Vibol Tan
(74) *Attorney, Agent, or Firm* — Clause Eight; Michael Catania

(57) ABSTRACT

An antenna system with co-located dipole antennas with mutually-orthogonal polarization is disclosed herein. The two antennas have planar geometry for the entire antenna and the two antennas are co-located in two mutually-orthogonal planes which provides an antenna solution for wireless communications with high isolation between the two antennas and polarization diversity in a minimum volume occupied. The two antennas operate in the same wireless communications band or in different bands.

11 Claims, 29 Drawing Sheets

(56) References Cited

U.S. PATENT DOCUMENTS

| | | |
|---|---|---|
| D606,053 S | 12/2009 | Wu et al. |
| D607,442 S | 1/2010 | Su et al. |
| D608,769 S | 1/2010 | Bufe |
| D612,368 S | 3/2010 | Yang et al. |
| 7,705,783 B2 | 4/2010 | Rao et al. |
| 7,729,662 B2 | 6/2010 | Abramov et al. |
| D621,819 S | 8/2010 | Tsai et al. |
| 7,843,390 B2 | 11/2010 | Liu |
| D633,483 S | 3/2011 | Su et al. |
| D635,127 S | 3/2011 | Tsai et al. |
| 7,907,971 B2 | 3/2011 | Salo et al. |
| D635,560 S | 4/2011 | Tsai et al. |
| D635,963 S | 4/2011 | Podduturi |
| D635,964 S | 4/2011 | Podduturi |
| D635,965 S | 4/2011 | Mi et al. |
| D636,382 S | 4/2011 | Podduturi |
| 7,965,242 B2 | 6/2011 | Abramov et al. |
| D649,962 S | 12/2011 | Tseng et al. |
| D651,198 S | 12/2011 | Mi et al. |
| D654,059 S | 2/2012 | Mi et al. |
| D654,060 S | 2/2012 | Ko et al. |
| D658,639 S | 5/2012 | Huang et al. |
| D659,129 S | 5/2012 | Mi et al. |
| D659,685 S | 5/2012 | Huang et al. |
| D659,688 S | 5/2012 | Huang et al. |
| 8,175,036 B2 | 5/2012 | Visuri et al. |
| 8,184,601 B2 | 5/2012 | Abramov et al. |
| D662,916 S | 7/2012 | Huang et al. |
| 8,248,970 B2 | 8/2012 | Abramov et al. |
| D671,097 S | 11/2012 | Mi et al. |
| 8,310,402 B2 | 11/2012 | Yang |
| D676,429 S | 2/2013 | Gosalia et al. |
| D678,255 S | 3/2013 | Ko et al. |
| 8,423,084 B2 | 4/2013 | Abramov et al. |
| D684,565 S | 6/2013 | Wei |
| D685,352 S | 7/2013 | Wei |
| D685,772 S | 7/2013 | Zheng et al. |
| D686,600 S | 7/2013 | Yang |
| D689,474 S | 9/2013 | Yang et al. |
| D692,870 S | 11/2013 | He |
| D694,738 S | 12/2013 | Yang |
| D695,279 S | 12/2013 | Yang et al. |
| D695,280 S | 12/2013 | Yang et al. |
| 8,654,030 B1 | 2/2014 | Mercer |
| 8,669,903 B2 | 3/2014 | Thill et al. |
| D703,195 S | 4/2014 | Zheng |
| D703,196 S | 4/2014 | Zheng |
| D706,247 S | 6/2014 | Zheng et al. |
| D706,750 S | 6/2014 | Bringuir |
| D706,751 S | 6/2014 | Chang et al. |
| D708,602 S | 7/2014 | Gosalia et al. |
| D709,053 S | 7/2014 | Chang et al. |
| D710,832 S | 8/2014 | Yang |
| D710,833 S | 8/2014 | Zheng et al. |
| 8,854,265 B1 | 10/2014 | Yang et al. |
| D716,775 S | 11/2014 | Bidermann |
| 9,432,070 B2 | 8/2016 | Mercer |
| 9,548,544 B2 * | 1/2017 | Watson ................ H01Q 19/108 |
| 9,825,367 B2 * | 11/2017 | Gong ....................... H01Q 9/18 |
| 9,912,043 B1 | 3/2018 | Yang |
| D818,460 S | 5/2018 | Montgomery |
| D823,285 S | 7/2018 | Montgomery |
| D832,241 S | 10/2018 | He et al. |
| 10,109,918 B2 | 10/2018 | Thill |
| 10,164,324 B1 | 12/2018 | He et al. |
| D842,280 S | 3/2019 | Montgomery |
| 10,270,185 B2 * | 4/2019 | Boutayeb .............. H01Q 1/2291 |
| 10,305,182 B1 | 5/2019 | Iellici |
| D857,671 S | 8/2019 | Montgomery et al. |
| D859,371 S | 9/2019 | Montgomery |
| D868,757 S | 12/2019 | He et al. |
| 10,511,086 B1 | 12/2019 | Thill |
| 2002/0003499 A1 | 1/2002 | Kouam et al. |
| 2004/0222936 A1 | 11/2004 | Hung et al. |
| 2005/0073462 A1 | 4/2005 | Lin et al. |
| 2005/0190108 A1 | 9/2005 | Lin et al. |
| 2006/0208900 A1 | 9/2006 | Tavassoli Hozouri |
| 2007/0030203 A1 | 2/2007 | Tsai et al. |
| 2008/0150829 A1 | 6/2008 | Lin et al. |
| 2009/0002244 A1 | 1/2009 | Woo |
| 2009/0058739 A1 | 3/2009 | Konishi |
| 2009/0135072 A1 | 5/2009 | Ke et al. |
| 2009/0262028 A1 | 10/2009 | Murnbru et al. |
| 2010/0188297 A1 | 7/2010 | Chen et al. |
| 2010/0309067 A1 | 12/2010 | Tsou et al. |
| 2010/0315195 A1 * | 12/2010 | Duron ................ H01Q 1/2216 340/5.1 |
| 2011/0006950 A1 | 1/2011 | Park et al. |
| 2012/0038514 A1 | 2/2012 | Bang |
| 2012/0229348 A1 | 9/2012 | Chiang |
| 2012/0242546 A1 | 9/2012 | Hu et al. |
| 2017/0054204 A1 | 2/2017 | Changalvala et al. |
| 2018/0213541 A1 * | 7/2018 | Riess ..................... H01Q 21/30 |
| 2020/0044365 A1 * | 2/2020 | Song ....................... H01Q 5/48 |

* cited by examiner

CO-LOCATED DIPOLES WITH MUTUALLY-ORTHOGONAL POLARIZATION

CROSS REFERENCE TO RELATED APPLICATION

The Present Application claims priority to U.S. Provisional Patent Application No. 62/788,840, filed on Jan. 5, 2018, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

This invention relates to co-located dipole antennas with mutually-orthogonal polarization for achieving high isolation between antennas within a minimum volume occupied.

Description of the Related Art

There is a need to provide high isolation and polarization diversity between two antennas within a minimum volume occupied.

General definitions for terms utilized in the pertinent art are set forth below.

BLUETOOTH technology is a standard short range radio link that operates in the unlicensed 2.4 gigahertz band.

Code Division Multiple Access ("CDMA") is a spread spectrum communication system used in second generation and third generation cellular networks, and is described in U.S. Pat. No. 4,901,307.

GSM, Global System for Mobile Communications is a second generation digital cellular network.

The Universal Mobile Telecommunications System ("UMTS") is a wireless standard.

Long Term Evolution ("LTE") is a standard for wireless communication of high-speed data for mobile phones and data terminals and is based on the GSM/EDGE and UMTS/HSPA communication network technologies.

LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5 MH (Band 11, 21, 24); 2300-2700 MHz (Band 7, 38, 40, 41); 3400-3800 MHz (Band 22, 42, 43).

Antenna impedance and the quality of the impedance match are most commonly characterized by either return loss or Voltage Standing Wave Ratio.

Surface Mount Technology ("SMT") is a process for manufacturing electronic circuits wherein the components are mounted or placed directly onto a surface of a printed circuit board ("PCB").

The APPLE IPHONE® 5 LTE Bands include: LTE 700/1700/2100 (698-806 MHz/1710-1785 MHz/1920-2170 MHz); LTE 850/1800/2100 (824-894 MHz/1710-1880 MHz/1920-2170 MHz); and LTE 700/850/1800/1900/2100 (698-806 MHz/824-894 MHz/1710-1880 MHz/1850-1990 MHz/1920/2170).

The SAMSUNG GALAXY® SIII LTE Bands include: LTE 800/1800/2600 (806-869 MHz/1710-1880 MHz/2496-2690 MHz.

The NOKIA LUMIA® 920 LTE Bands: LTE 700/1700/2100 (698-806 MHz/1710-1785 MHz/1920-2170 MHz); LTE 800/900/1800/2100/2600 (806-869 MHz/880-960 MHz/1710-1880 MHz/1920-2170 MHz/2496-2690 MHz).

The prior art has not met this need.

BRIEF SUMMARY OF THE INVENTION

An objective of the present invention is to achieve high isolation between two closely-spaced antennas and polarization diversity in a minimum volume occupied by antennas The present invention co-locates dipole antennas with mutually-orthogonal polarizations.

One aspect of the present invention is an antenna system with co-located dipoles with mutually-orthogonal polarization, the antenna system comprising: two antennas within a minimum volume occupied.

Another aspect of the present invention is a An antenna system for multiple-input-multiple-output (MIMO) communication. The antenna system comprises a first dipole antenna and a second dipole antenna. The first dipole antenna and the second dipole antenna are co-located with mutually-orthogonal polarization. The first dipole antenna comprises a dielectric substrate, a plurality of dipole arms, an antenna balun, a metallization section and a feed point. The second dipole antenna comprises a dielectric substrate, a plurality of dipole arms, an antenna balun, a metallization section and a feed point.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

The present invention provides high isolation and polarization diversity between two antennas within minimum volume occupied. The antennas operate in the same wireless communications band or in different bands. The antennas are preferably fed via coaxial cables or via transmission lines. The antennas are preferably made of metallization on dielectric substrates of sheet metal.

The present invention utilizes antennas with planar geometry for the entire antenna and co-locates the two antennas in two mutually-orthogonal planes which provides an antenna solution for wireless communications with high isolation between antennas and polarization diversity in minimum volume occupied. Different embodiments of the invention consist of antennas operating in the same wireless communications band (2G or 5G) or in different bands. Yet, different embodiments of the invention consist of antennas fed via coaxial cables or via transmission lines. Yet, different embodiments of the invention consist of antennas comprising of metallization on dielectric substrates or comprising of sheet metal with the appropriate geometry. Different embodiments of the invention comprise of co-located mutually orthogonal dipoles mounted on a dedicated plastic carrier. Different embodiments of the invention comprise of co-located mutually-orthogonal dipoles having appropriate features for mounting to the wireless device housing (enclosure).

The present invention is preferably two antennas operating in a dedicated band or plurality of bands for wireless communications and serving as radiating elements in a frequency band or plurality of bands of operation. A coaxial cable preferably feeds the antenna radiating element. A transmission feed line alternatively feeds antenna radiating element. A plastic carrier is for mounting and locating the two antennas in particular orientation and displacement relative to each other.

Simulations of single antenna element ensured optimal antenna performance as a standalone radiating element. Simulations of two co-located mutually-orthogonal dipole antennas ensured optimal antenna performance as a standalone radiating element. Fabrication of the two co-located mutually-orthogonal dipole antennas confirmed and validated the antenna performance as expected from simulations.

Figure 1:
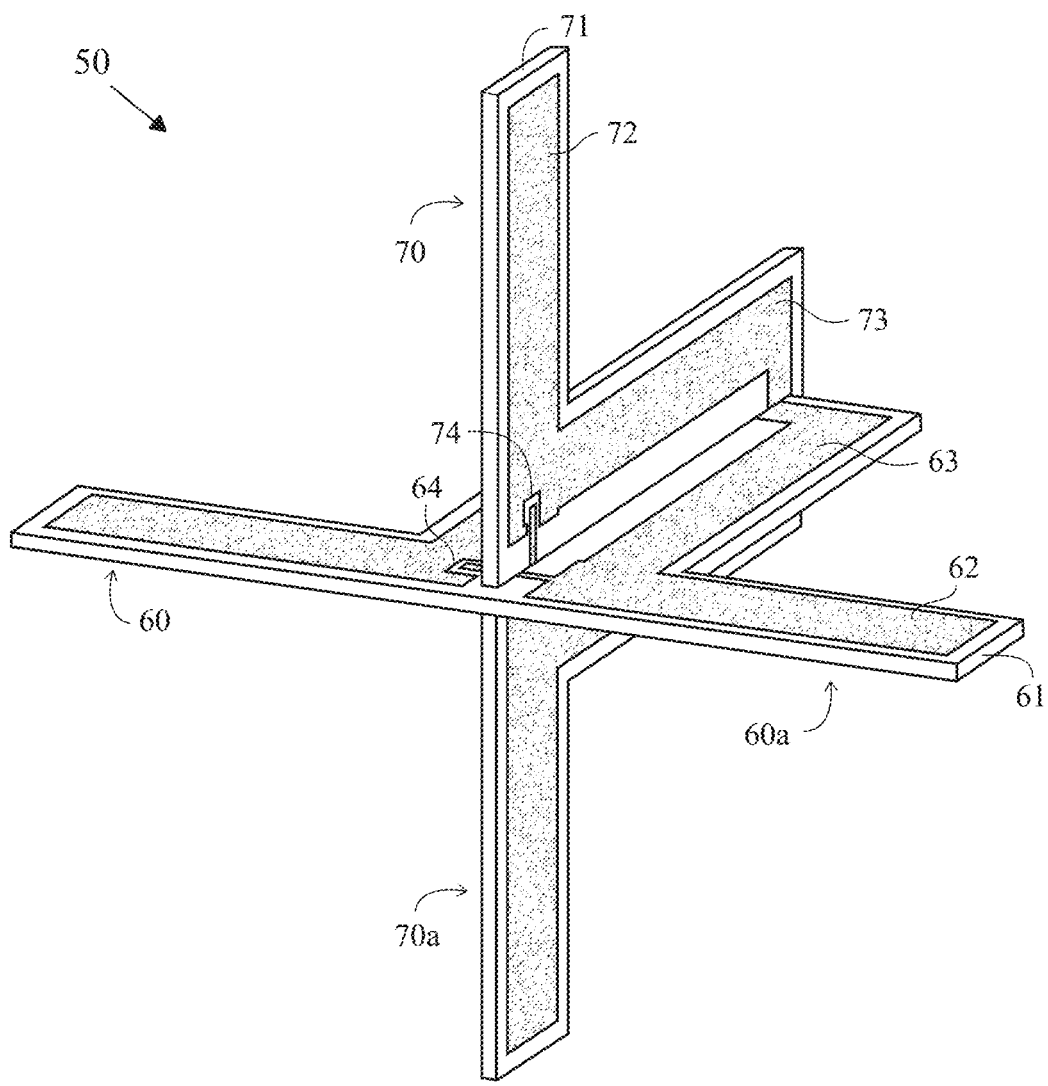
FIG. 1 is a top perspective view of an antenna system with co-located dipoles with mutually-orthogonal polarization.

FIG. 1 is a top perspective view of an antenna system 50 with co-located dipole antennas with mutually-orthogonal polarization. The first dipole antenna preferably comprises a dielectric substrate 61, a plurality of dipole arms 60 and 60*a*, an antenna balun 63, a metallization section 62 and a feed point 64. The second dipole antenna preferably comprises a dielectric substrate 71, a plurality of dipole arms 70 and 70*a*, an antenna balun 73, a metallization section 72 and a feed point 74.

Figure 2:
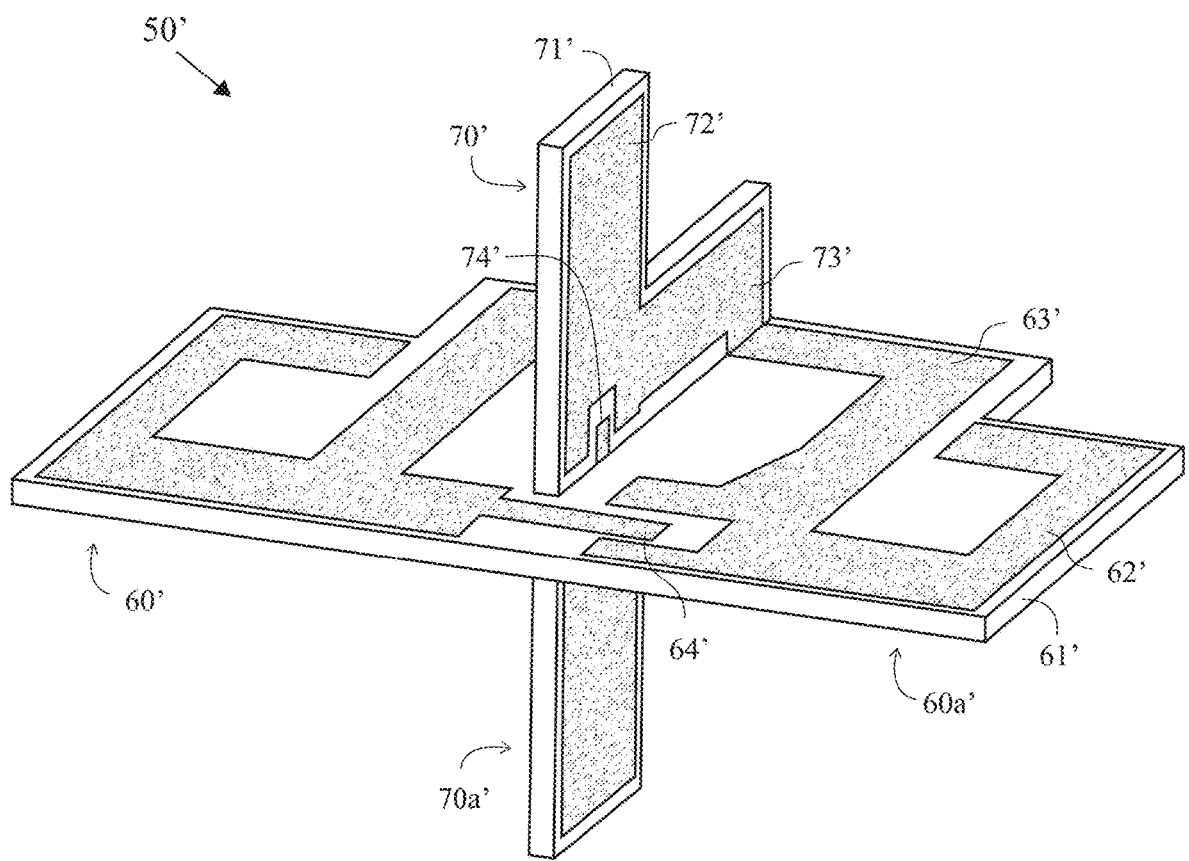
FIG. 2 is a top perspective view of an antenna system with co-located dipoles with mutually-orthogonal polarization.

FIG. 2 is a top perspective view of an antenna system 50' with co-located dipole antennas with mutually-orthogonal polarization. The first dipole antenna preferably comprises a dielectric substrate 61', a plurality of dipole arms 60' and 60*a'*, an antenna balun 63', a metallization section 62' and a feed point 64'. The second dipole antenna preferably comprises a dielectric substrate 71', a plurality of dipole arms 70' and 70*a'*, an antenna balun 73', a metallization section 72' and a feed point 74'.

Figure 3:
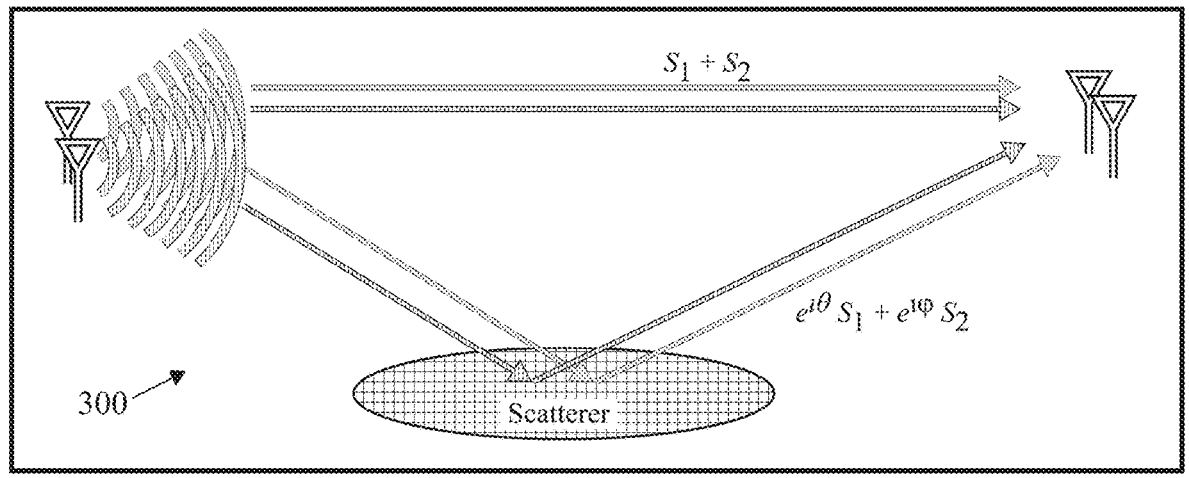
FIG. 3 is a prior art figure from "Communication in a disordered world" by Steven H. Simon, Aris L. Moustakas, Marin Stoytchev, Hugo Safar, Bell Labs, Lucent Technologies published in Physics Today, September 2001.

A simplistic illustration of Multiple-Input-Multiple-Output (MIMO) communication scheme is shown in FIG. 3. In multipath propagation environment, employing multiple antennas with independent radio channels allows for sending multiple independent streams of information. This leads to manifold increase of the communication throughput compared to single-channel communications (SISO). The increase is by a factor of N, where N is the minimum number of antennas on either side.

Figure 4:
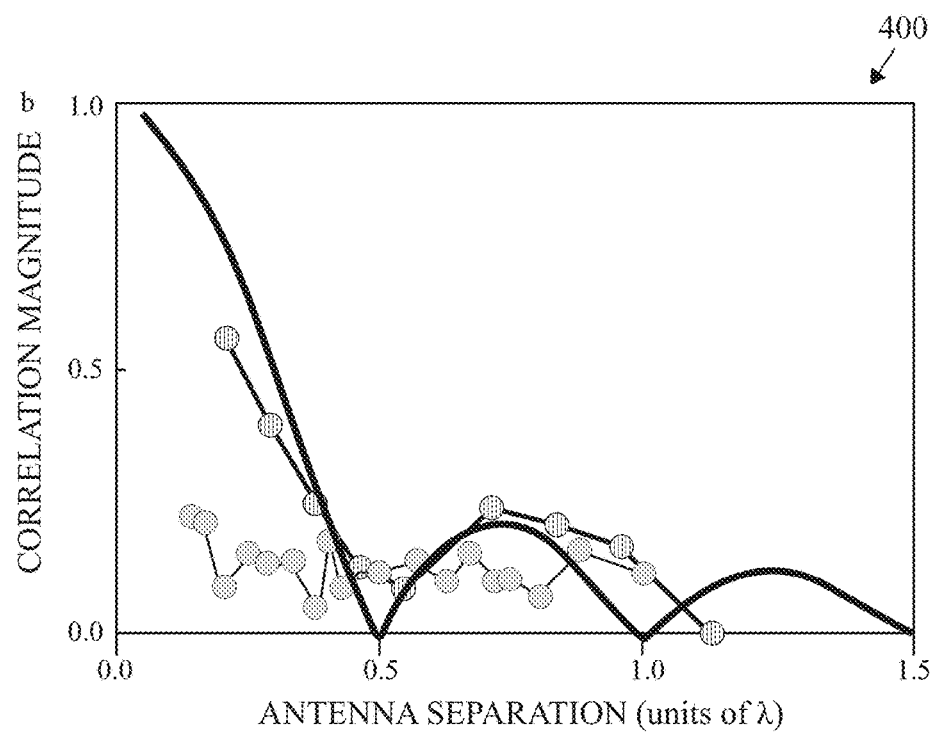
FIG. 4 is a prior art figure from "Communication in a disordered world" by Steven H. Simon, Aris L. Moustakas, Marin Stoytchev, Hugo Safar, Bell Labs, Lucent Technologies published in Physics Today, September 2001.

As shown in FIG. 4, in order to achieve full MIMO capacity, the correlation between each antenna pair on one side needs to be low (preferably below 0.2 in magnitude). This condition is achieved by employing spatial diversity (Omni antennas separated in space), pattern diversity (closely-spaced antennas with complimentary patterns), polarization diversity (closely-spaced antennas with orthogonal polarization). Spatial and pattern diversity work in multipath propagation environment only. Polarization diversity works in any condition.

Figure 5:
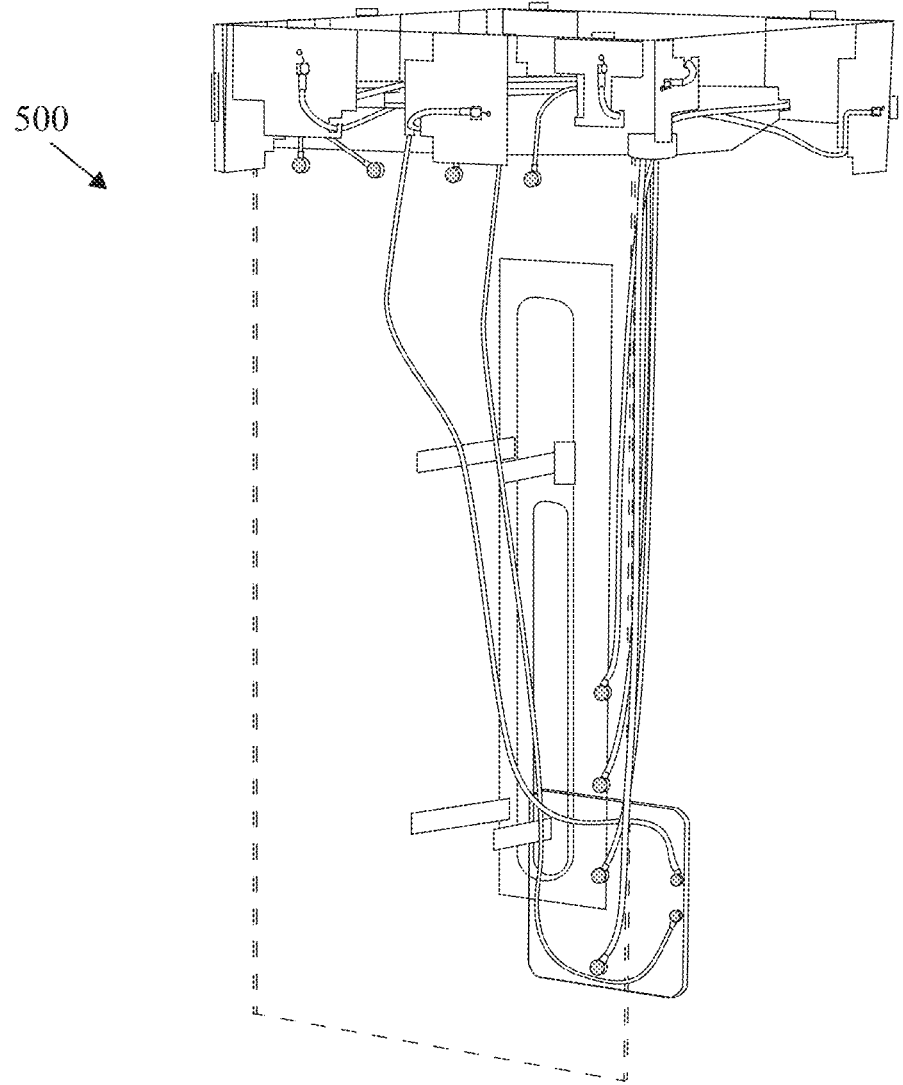
FIG. 5 is an illustration of a prior art WiFi 802.11ax communication system.

As shown in FIG. 5, modern WiFi 802.11ax communication devices typically have four Dual-Band (DB) antennas and four 5-GHz only antennas which are connected to two different radios, respectively. High data rates are achieved by implementing high-order modulation schemes (e.g. 64 QAM). In order to implement these high-order modulations schemes, it is required that the isolation between the 5-GHz antennas and the DB antennas is high (35 dB and higher). This is due to the fact that the 5-GHz only radio and the DB radio can operate simultaneously and isolation at 5 GHz between the antennas becomes critical.

For modern MIMO communications there are two major requirements which antennas must meet: 1) a low degree of correlation between any two antennas on each side of the communication link to provide full benefit of MIMO; 2) a high isolation between any two antennas on each side of the link to enable implementing high-order modulation schemes. The present invention demonstrates the benefits of co-located or closely located dipoles with mutually orthogonal polarization over employing spatial diversity using omni antennas.

Figure 6:
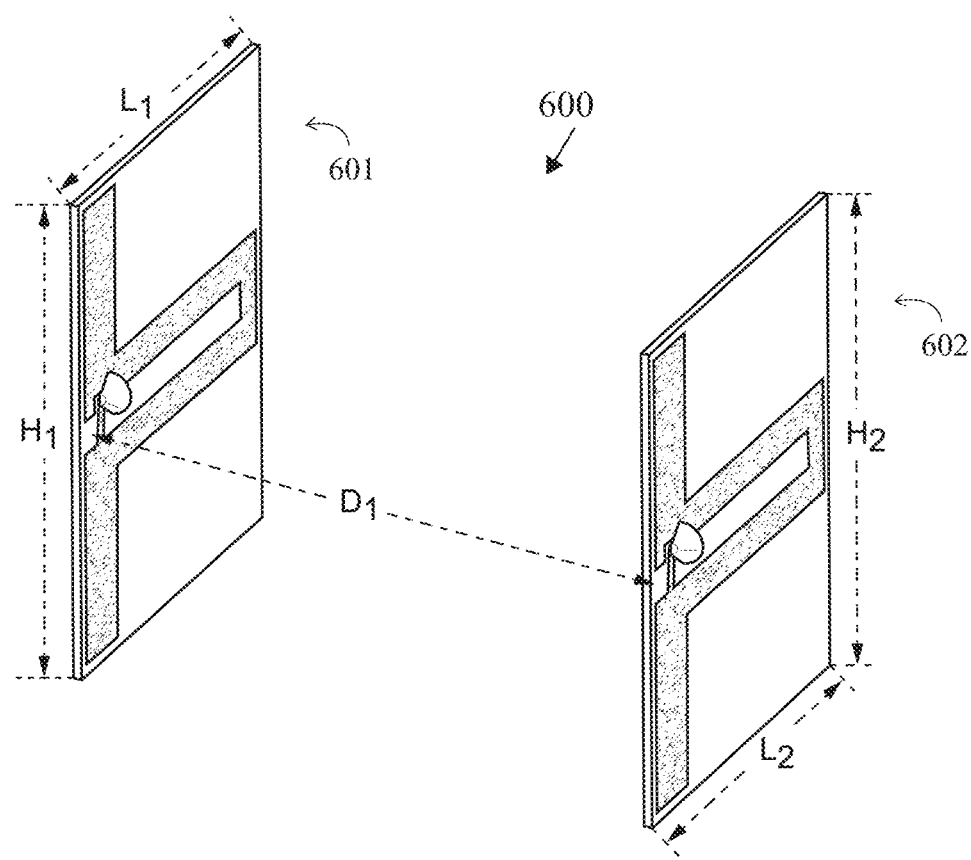
FIG. 6 is an illustration of a first embodiment of a single band 2.4 GHz dipole configuration with V/V dipoles at a separation d of 60 mm (1/2), and an occupied volume of 60 mm×50 mm×30 mm.
Figure 7:
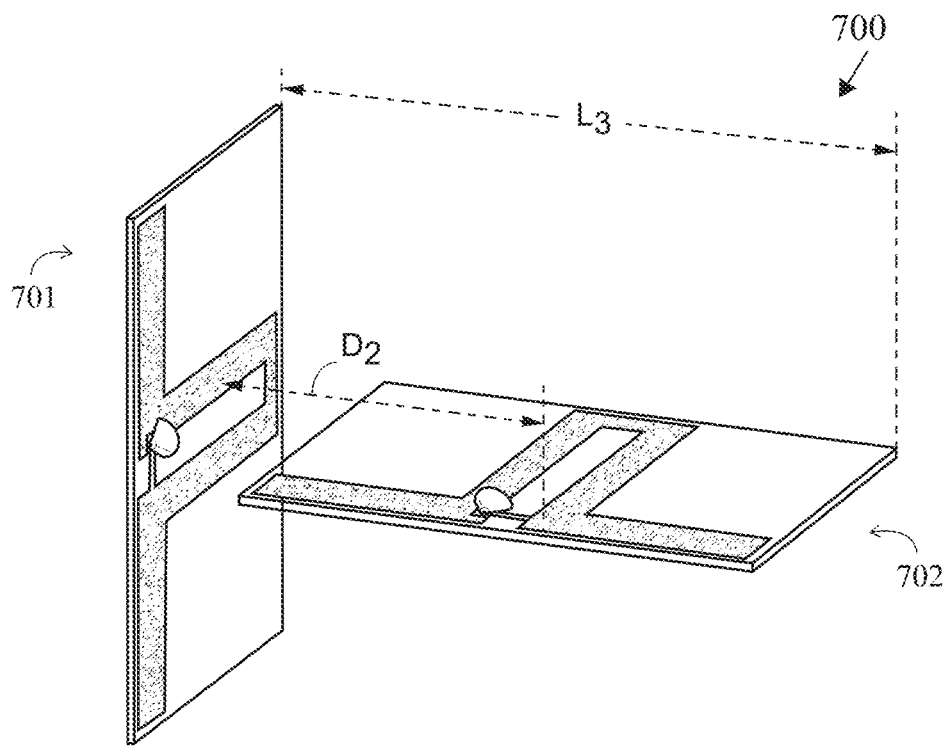
FIG. 7 is an illustration of a second embodiment of a single band 2.4 GHz dipole configuration with V/H dipoles at a separation d of 35 mm, and an occupied volume of 60 mm×50 mm×30 mm.
Figure 8:
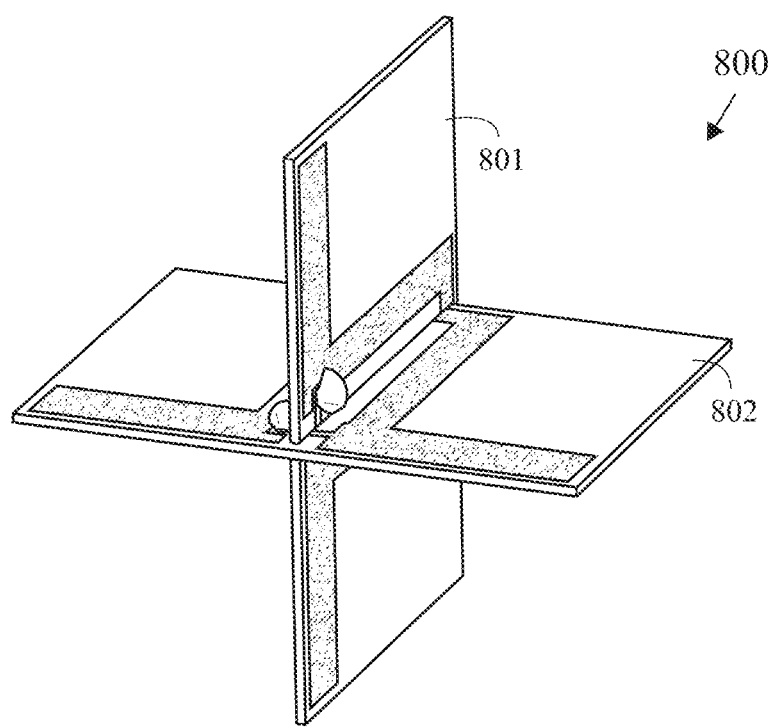
FIG. 8 is an illustration of a third embodiment of a single band 2.4 GHz dipole configuration with V/H dipoles at a separation d of 0 mm, and an occupied volume of 50 mm×50 mm×30 mm.

As shown FIGS. 6-8, all of the antenna configurations meet the first requirement for low degree of correlation between antennas; for V/V dipoles multipath environment is assumed. The isolation between antennas is achieved in each of these cases. FIG. 6 is an illustration of a first embodiment of an antenna system 600 having a single band 2.4 GHz dipole configuration with V/V (vertical/vertical) dipole antennas 601 and 602 at a preferred separation d of 60 mm (1/2), and a preferred occupied volume of 60 mm×50 mm×30 mm. FIG. 7 is an illustration of a second embodiment of an antenna system 700 having a single band 2.4 GHz dipole configuration with V/H (vertical/horizontal) dipole antennas 701 and 702 at a preferred separation d of 35 mm, and a preferred occupied volume of 60 mm×50 mm×30 mm. FIG. 8 is an illustration of a third embodiment of an antenna system 800 having a single band 2.4 GHz dipole configuration with co-located V/H dipole antennas 801 and 802 at a preferred separation d of 0 mm, and a preferred occupied volume of 50 mm×50 mm×30 mm.

Figure 9:
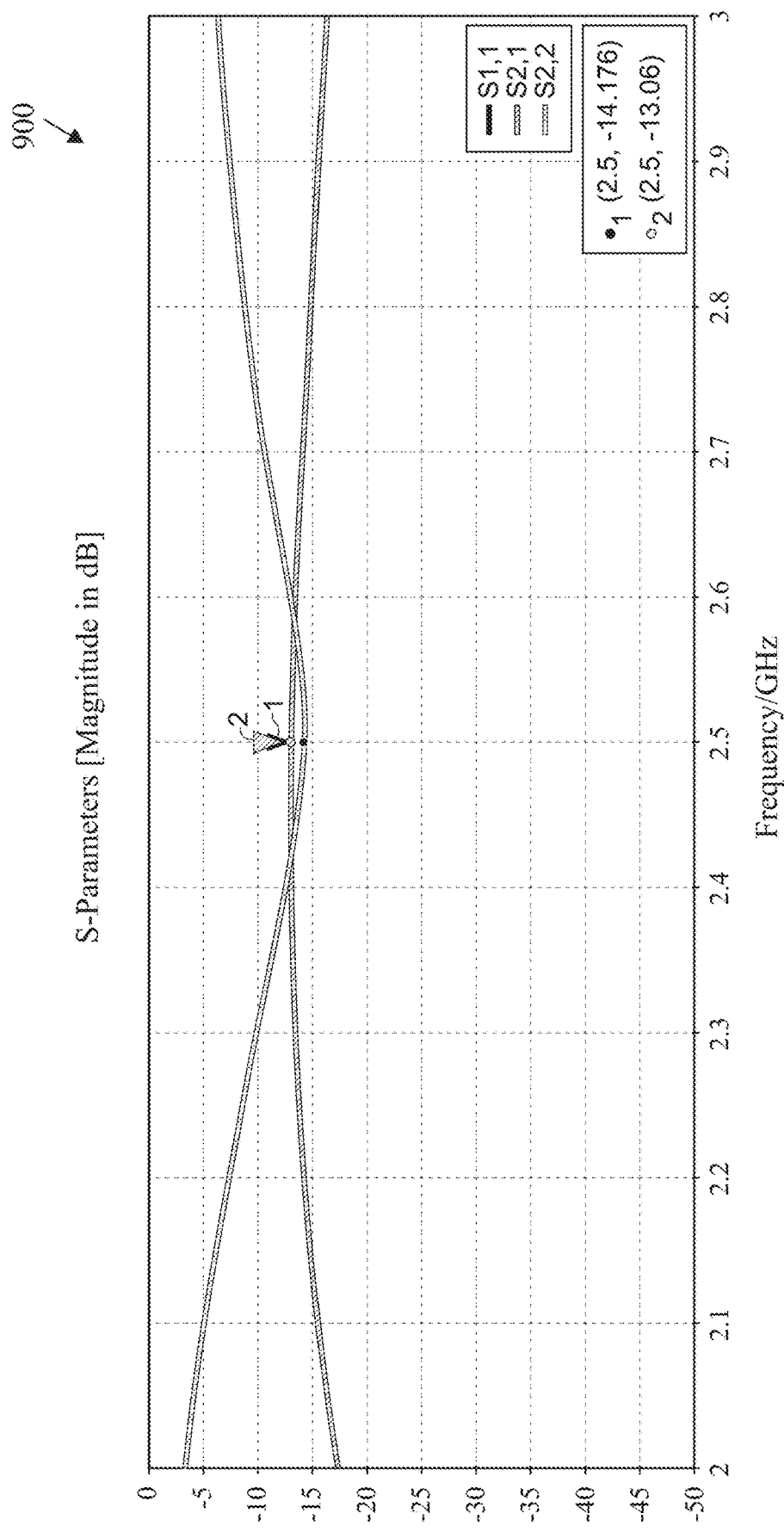
FIG. 9 is a graph of antenna return loss and isolation for the V/V dipoles at a separation d of 60 mm of FIG. 6.
Figure 10:
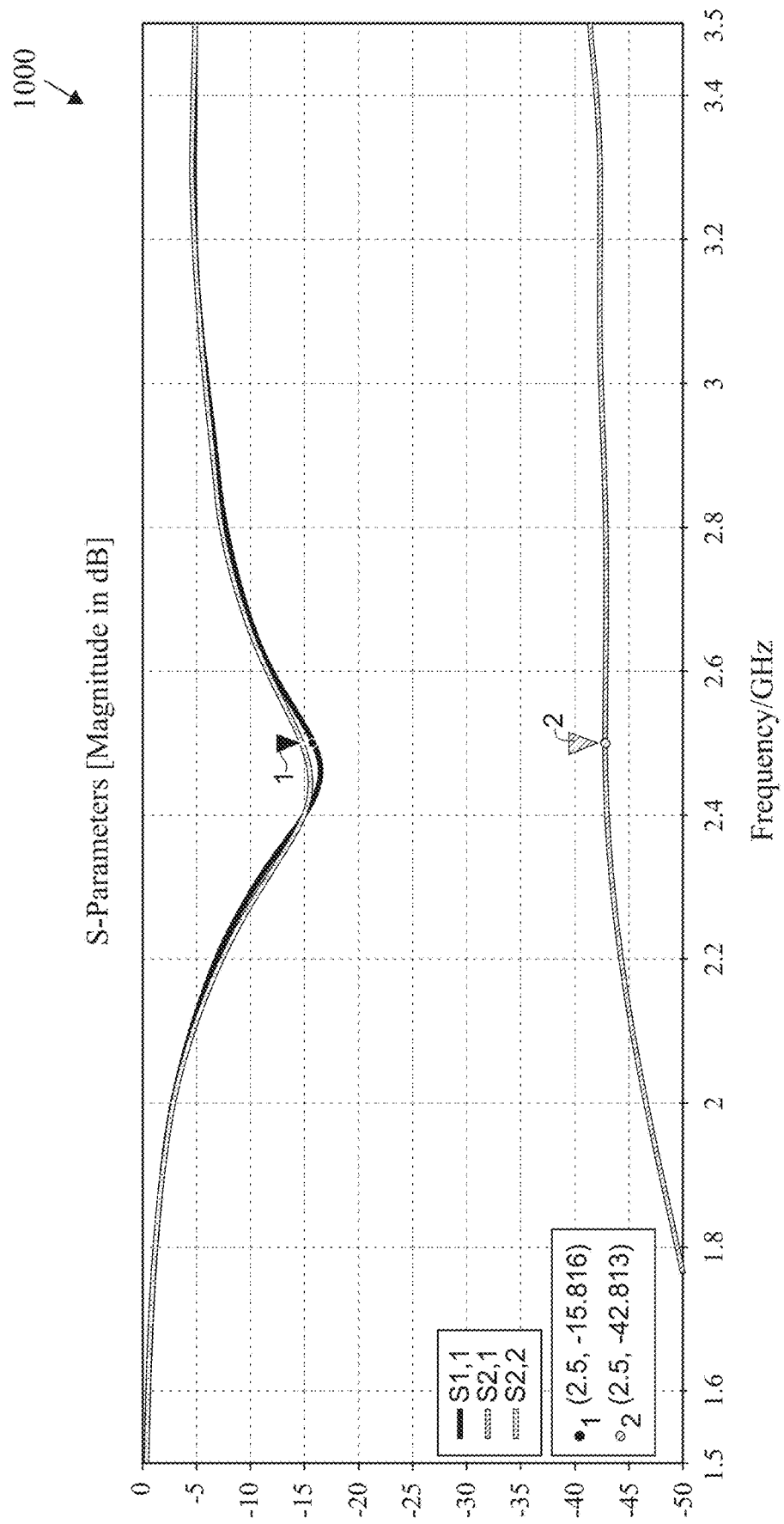
FIG. 10 is a graph of antenna return loss and isolation for the V/H dipoles at a separation d of 35 mm of FIG. 7.
Figure 11:
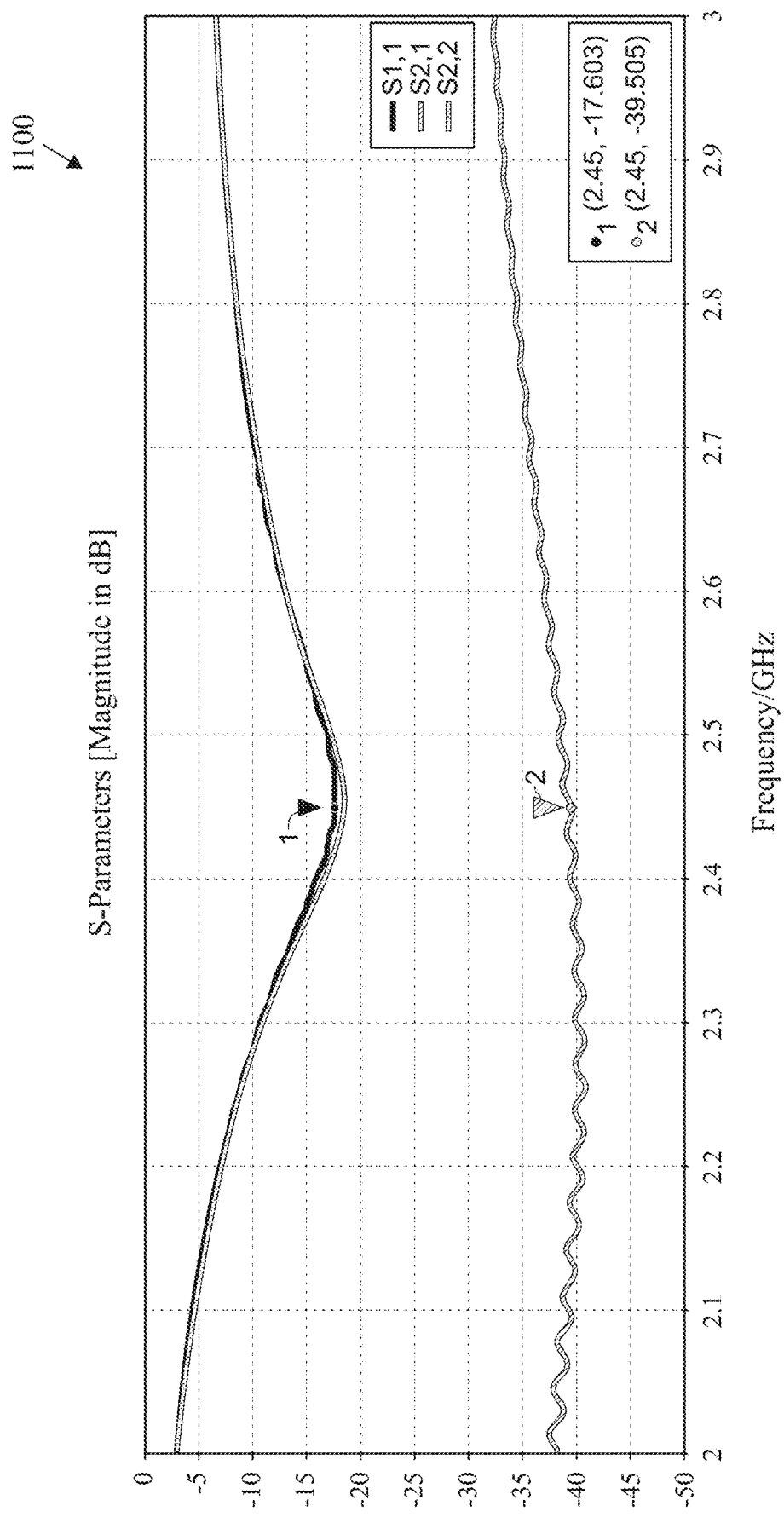
FIG. 11 is a graph of antenna return loss and isolation for the V/H dipoles at a separation d of 0 mm of FIG. 8.

FIG. 9 is a graph 900 of antenna return loss and isolation for the V/V dipoles at a separation d of 60 mm of FIG. 6. FIG. 10 is a graph 1000 of antenna return loss and isolation for the V/H dipoles at a separation d of 35 mm of FIG. 7. FIG. 11 is a graph 1100 of antenna return loss and isolation for the V/H dipoles at a separation d of 0 mm of FIG. 8. As shown in FIGS. 9-11, in all cases, the antennas have excellent return loss providing large impedance bandwidth (S11<−10 dB). However, the isolation between the antennas is nearly four-orders of magnitude better in the case of V/H antennas with only marginally lower isolation in the case of co-located V/H dipoles. This increase in antenna isolation makes it possible to implement higher-order modulation schemes used in 802.11ax communications.

Figure 12:
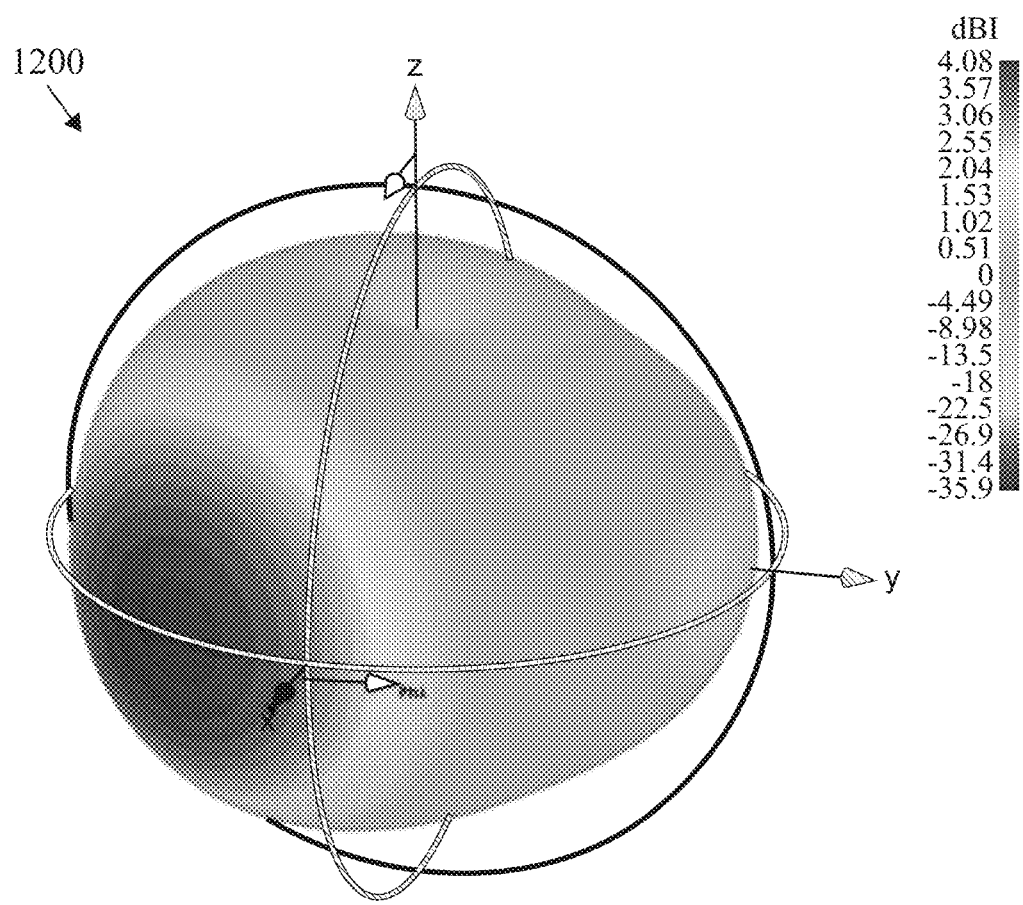
FIG. 12 is an illustration of an antenna pattern at 2500 MHz for the V/V dipoles at a separation d of 60 mm of FIG. 6.
Figure 13:
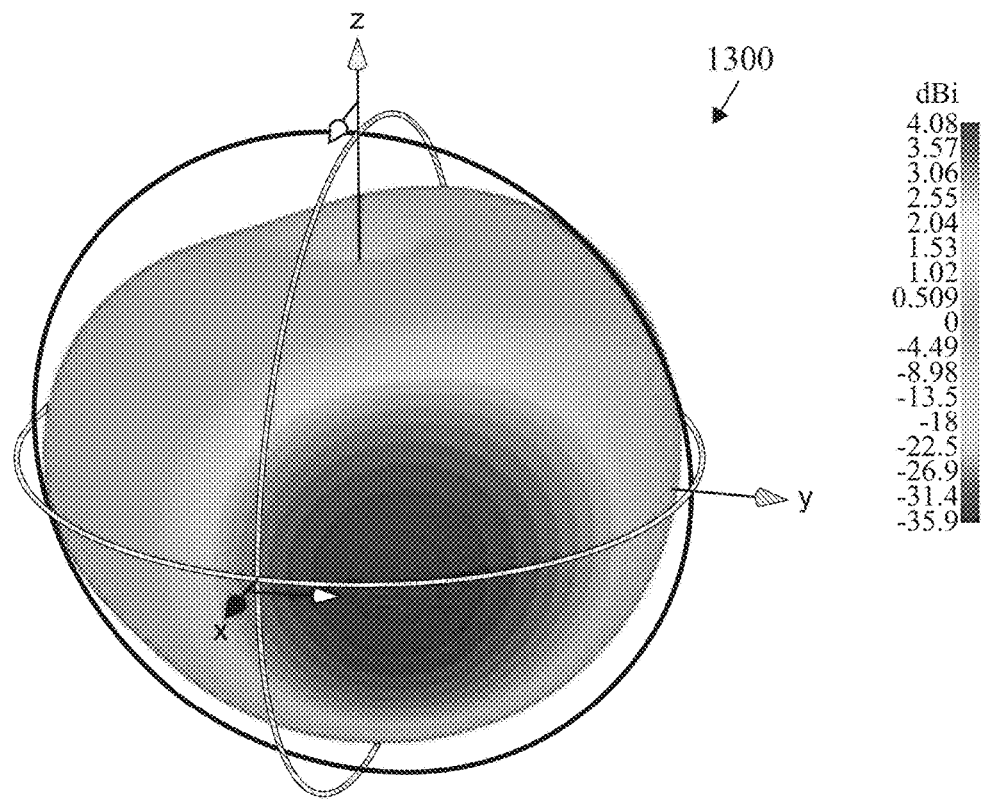
FIG. 13 is an illustration of an antenna pattern at 2500 MHz for the V/V dipoles at a separation d of 60 mm of FIG. 6.
Figure 14:
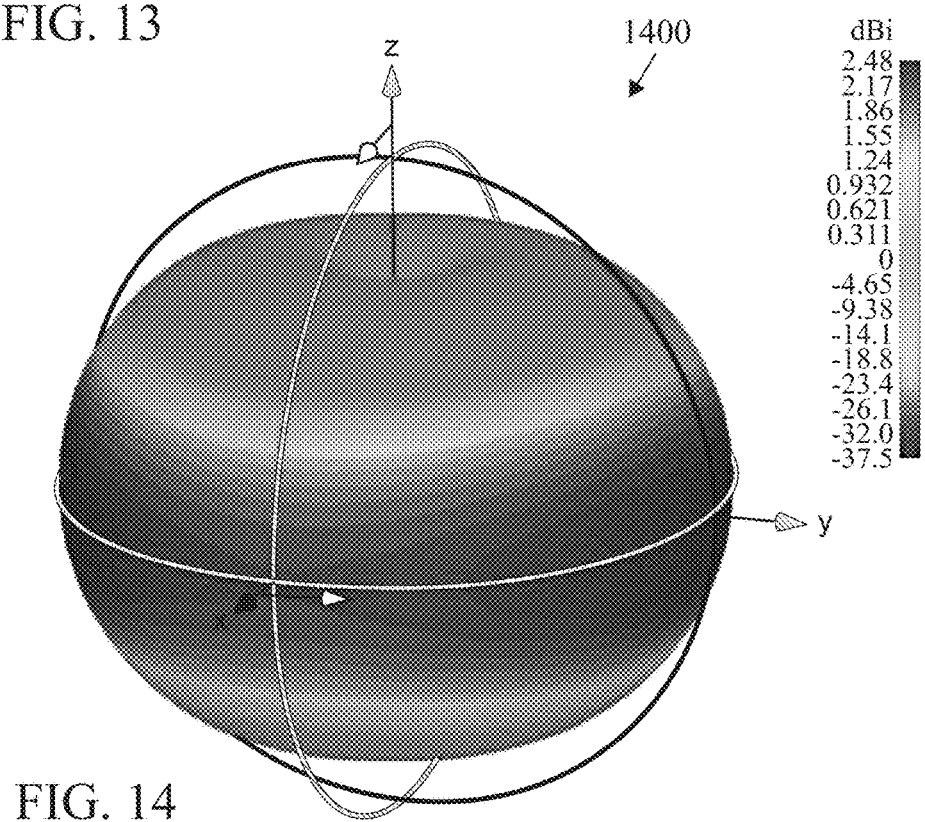
FIG. 14 is an illustration of an antenna pattern at 2500 MHz for the V/H dipoles at a separation d of 35 mm of FIG. 7.
Figure 15:
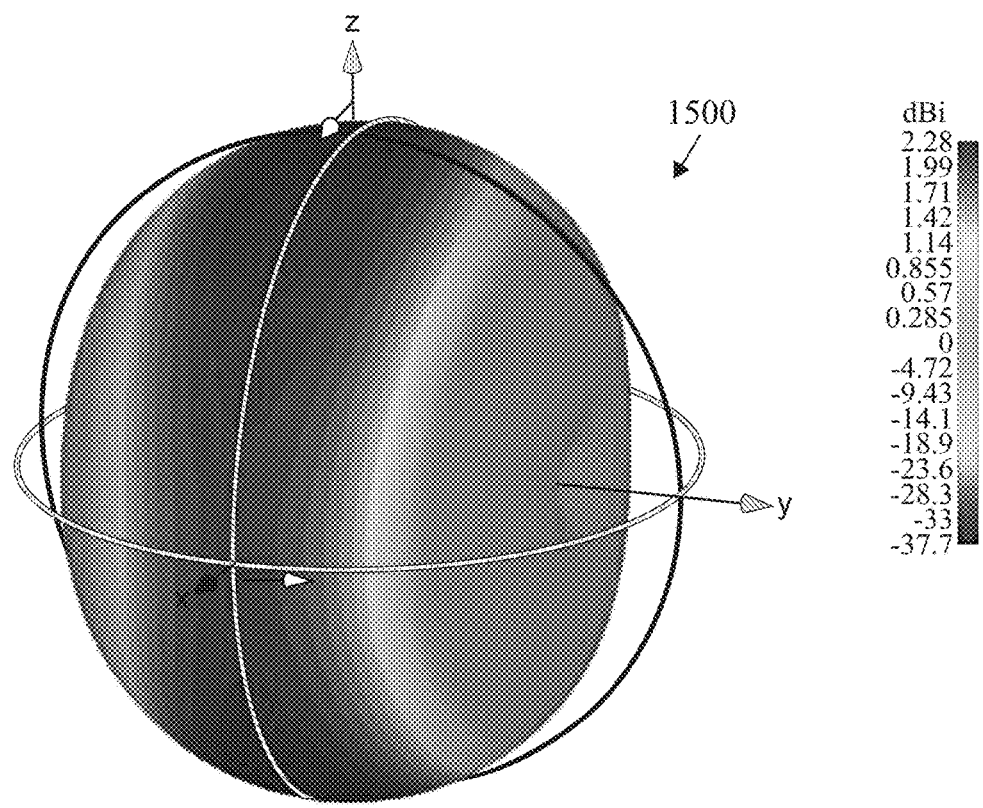
FIG. 15 is an illustration of an antenna pattern at 2500 MHz for the V/H dipoles at a separation d of 35 mm of FIG. 7.
Figure 16:
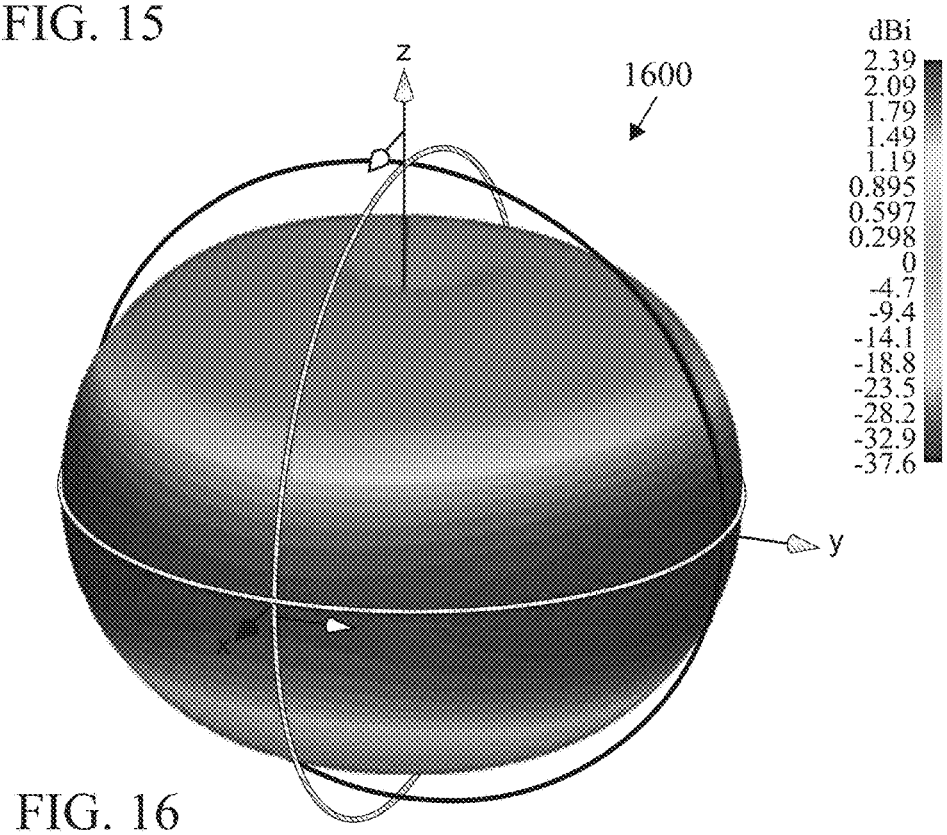
FIG. 16 is an illustration of an antenna pattern at 2500 MHz for the V/H dipoles at a separation d of 0 mm of FIG. 8.
Figure 17:
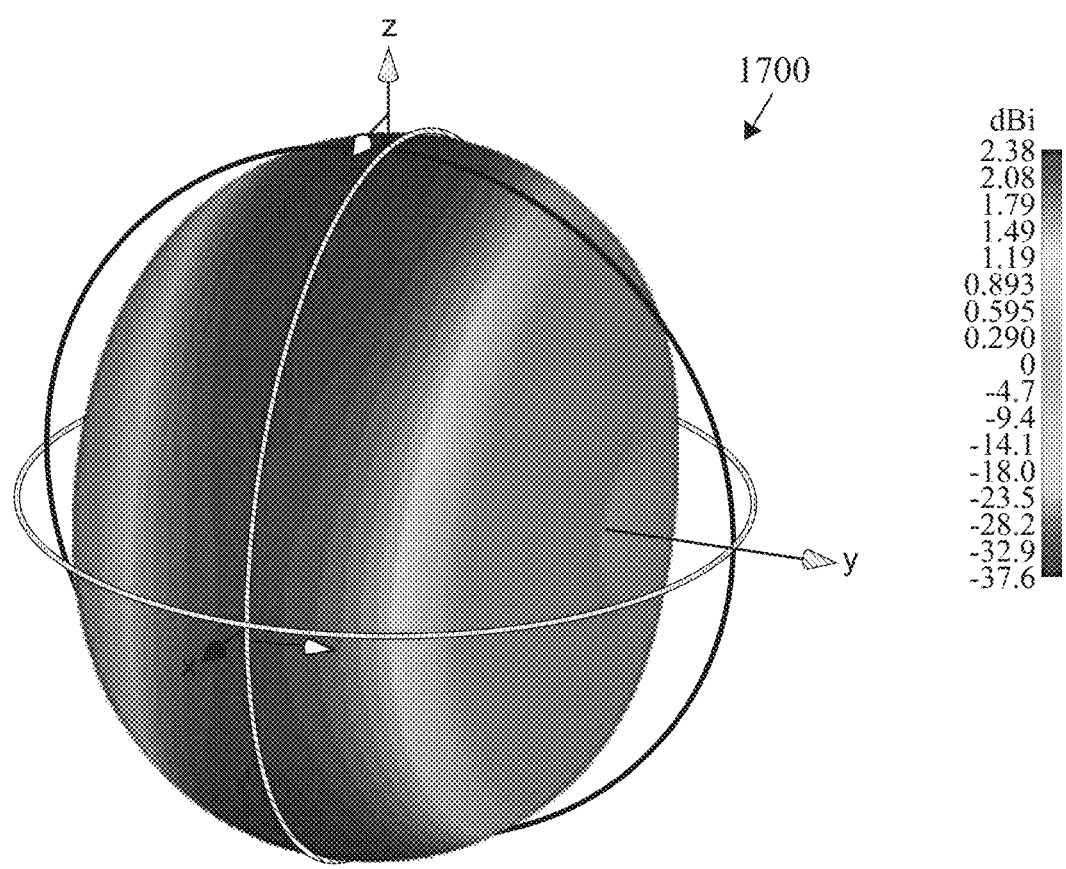
FIG. 17 is an illustration of an antenna pattern at 2500 MHz for the V/H dipoles at a separation d of 0 mm of FIG. 8.

FIG. 12 is an illustration of an antenna pattern 1200 at 2500 MHz for the V/V dipoles at a separation d of 60 mm of FIG. 6. FIG. 13 is an illustration of an antenna pattern 1300 at 2500 MHz for the V/V dipoles at a separation d of 60 mm of FIG. 6. FIG. 14 is an illustration of an antenna pattern 1400 at 2500 MHz for the V/H dipoles at a separation d of 35 mm of FIG. 7. FIG. 15 is an illustration of an antenna pattern 1500 at 2500 MHz for the V/H dipoles at a separation d of 35 mm of FIG. 7. FIG. 16 is an illustration of an antenna pattern 1600 at 2500 MHz for the V/H dipoles at a separation d of 0 mm of FIG. 8. FIG. 17 is an illustration of an antenna pattern 1700 at 2500 MHz for the V/H dipoles at a separation d of 0 mm of FIG. 8. As shown in FIGS. 12-17, in the case of V/V dipoles, the antenna patterns are "deformed" due to the strong coupling between the antennas. In the case of V/H dipole antennas, both d=35 mm and d=0 mm, the original dipole pattern is preserved which allows for predicting reliably the antenna and the overall system performance.

Figure 18:
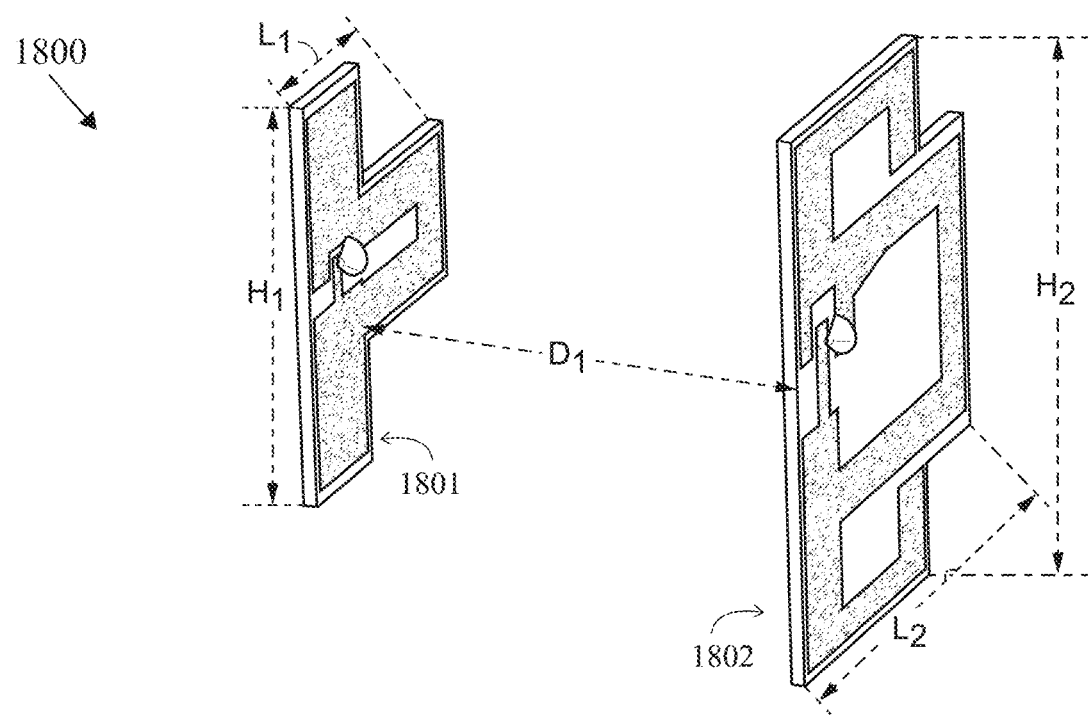
FIG. 18 is an illustration of a first embodiment of a dual band 5 GHz dipole configuration with V/V dipoles at a separation d of 30 mm (1/2), and an occupied volume of 30 mm×30 mm×22 mm.
Figure 19:
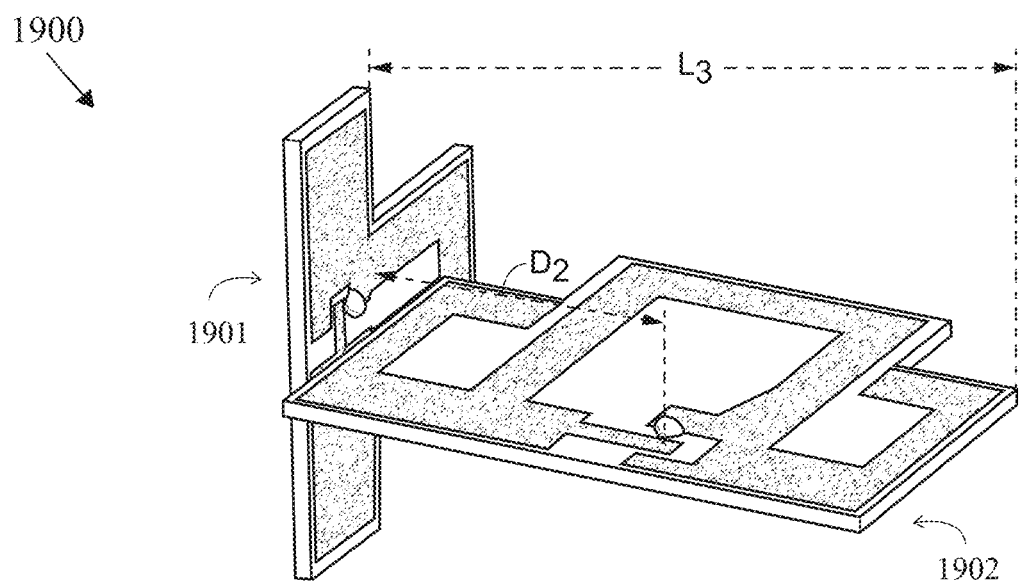
FIG. 19 is an illustration of a second embodiment of a dual band 5 GHz dipole configuration with V/H dipoles at a separation d of 18 mm, and an occupied volume of 33 mm×23 mm×22 mm.
Figure 20:
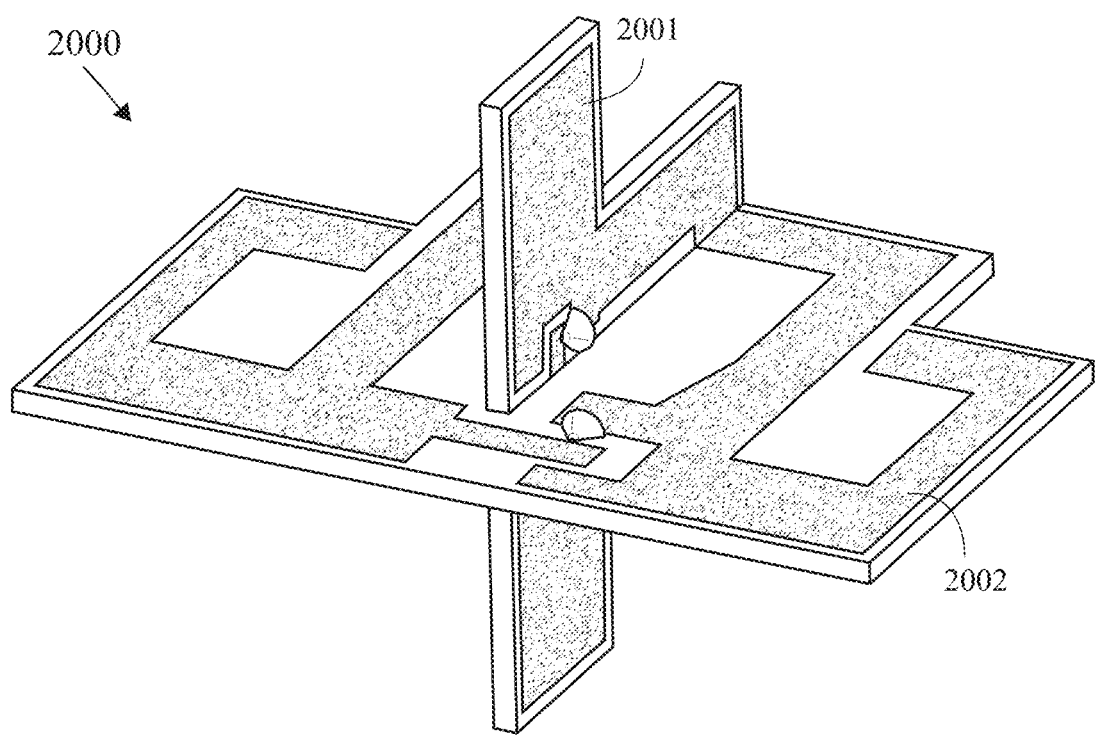
FIG. 20 is an illustration of a third embodiment of a dual band 5 GHz dipole configuration with V/H dipoles at a separation d of 0 mm, and an occupied volume of 30 mm×23 mm×22 mm.

As shown in FIGS. 18-20, all of the antenna configurations meet the first requirement for low degree of correlation between antennas; for V/V dipoles multipath environment is assumed. The isolation between antennas achieved in each of these cases. FIG. 18 is an illustration of a first embodiment of an antenna system 1800 having a dual band 5 GHz dipole configuration with V/V dipole antennas 1801 and 1802 at a preferred separation d of 30 mm (1/2), and a preferred occupied volume of 30 mm×30 mm×22 mm. FIG. 19 is an illustration of a second embodiment of an antenna system 1900 having a dual band 5 GHz dipole configuration with V/H dipole antennas 1901 and 1902 at a preferred separation d of 18 mm, and a preferred occupied volume of 33 mm×23 mm×22 mm. FIG. 20 is an illustration of a third embodiment of an antenna system 2000 having a dual band 5 GHz dipole configuration with V/H dipole antennas 2001 and 2002 at a preferred separation d of 0 mm, and a preferred occupied volume of 30 mm×23 mm×22 mm.

Figure 21A:
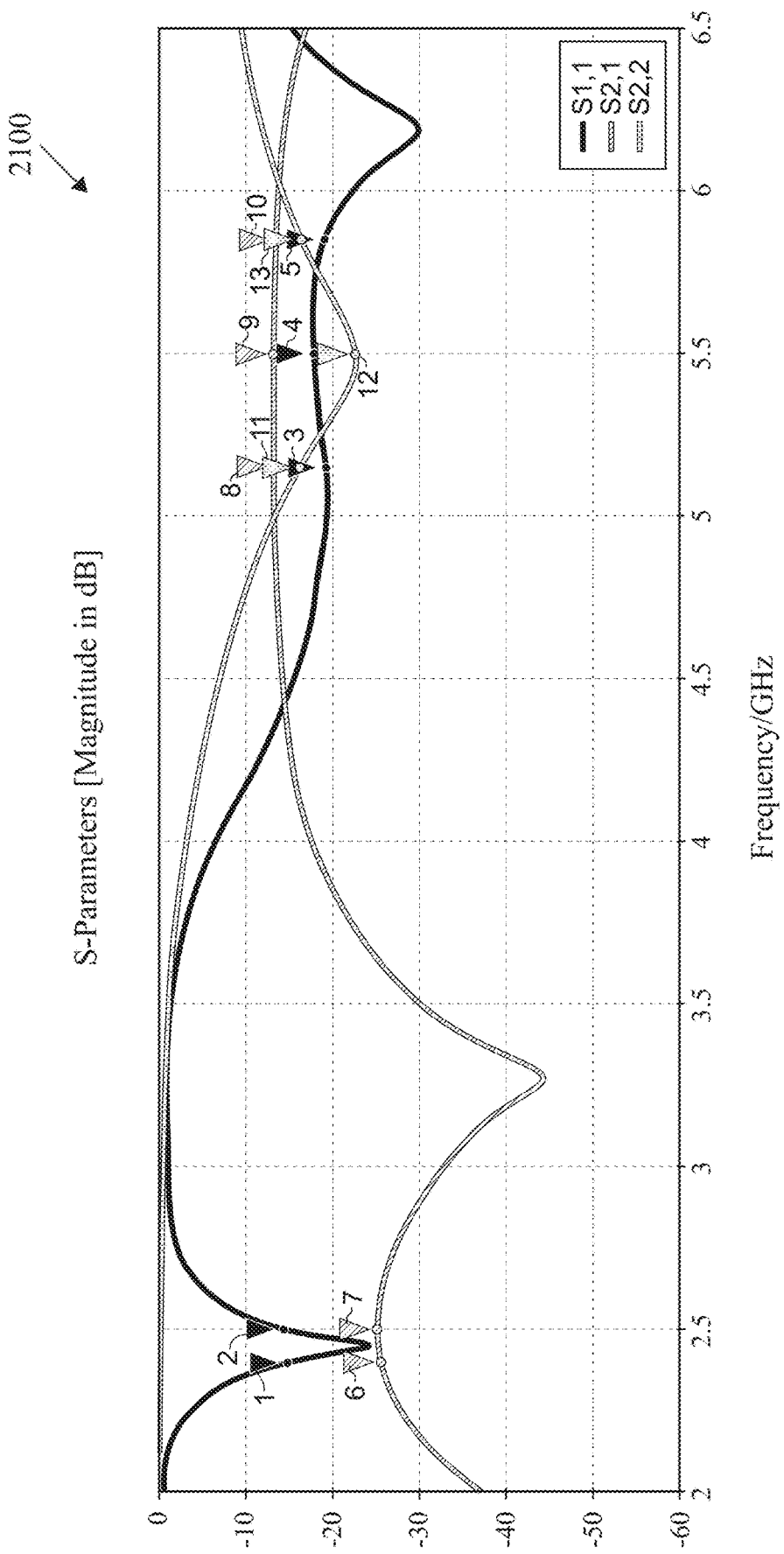
FIG. 21A is a graph of antenna return loss and isolation for the V/V dipoles at a separation d of 30 mm of FIG. 18.
Figure 21B:
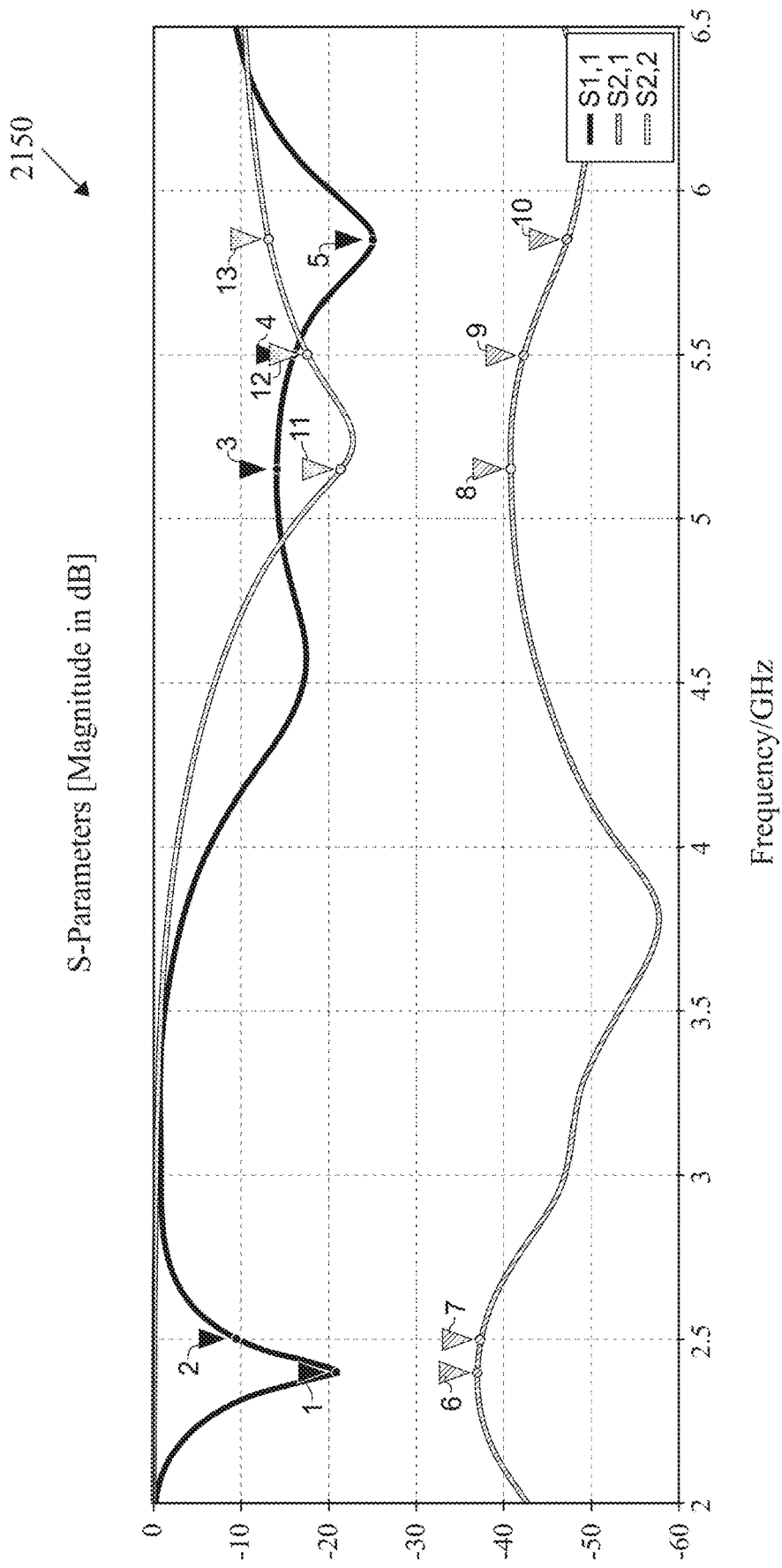
FIG. 21B is a graph of antenna return loss and isolation for the V/H dipoles at a separation d of 18 mm of FIG. 19.
Figure 22:
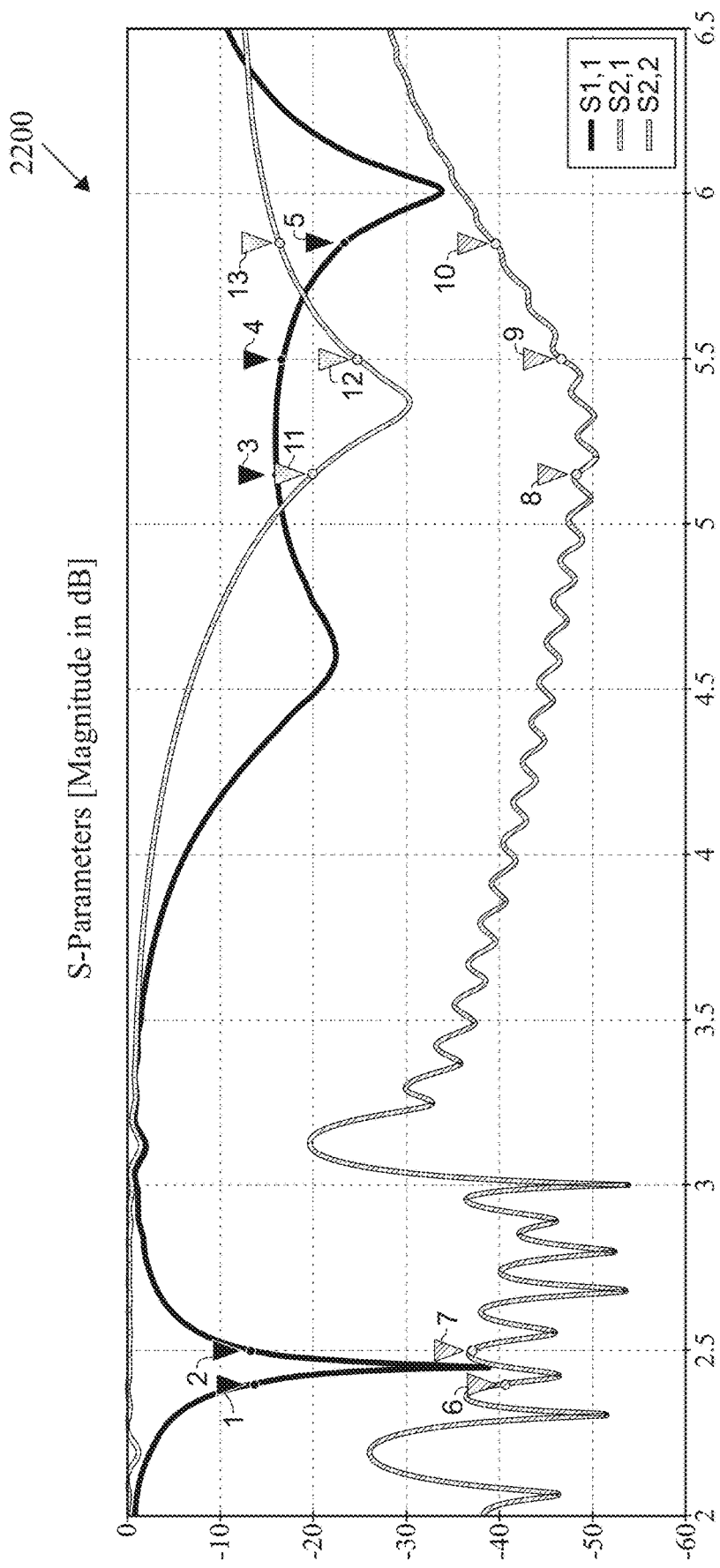
FIG. 22 is a graph of antenna return loss and isolation for the V/H dipoles at a separation d of 0 mm of FIG. 20.

FIG. 21A is a graph 2100 of antenna return loss and isolation for the V/V dipoles at a separation d of 30 mm of FIG. 18. FIG. 21B is a graph 2150 of antenna return loss and isolation for the V/H dipoles at a separation d of 18 mm of FIG. 19. FIG. 22 is a graph 2200 of antenna return loss and isolation for the V/H dipoles at a separation d of 0 mm of FIG. 20. As shown in FIGS. 21A, 21B and 22, in all cases, the antennas have excellent return loss providing large impedance bandwidth (S11<−10 dB). The isolation at 5 GHz is relatively poor for the V/V dipoles and improved to better than 40 dB for the X-pol dipoles. This increase in antenna isolation makes it possible to implement higher-order modulation schemes used in 802.11ax communications.

Figure 23:
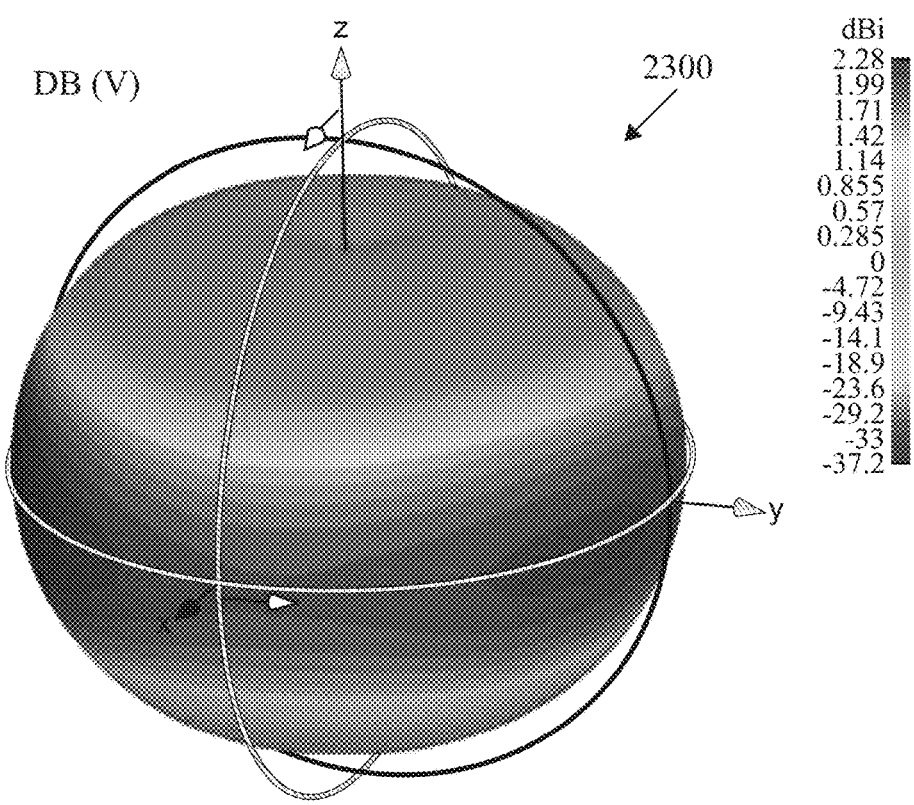
FIG. 23 is an illustration of an antenna pattern at 2400 MHz for the V/V dipoles at a separation d of 30 mm of FIG. 18.
Figure 24:
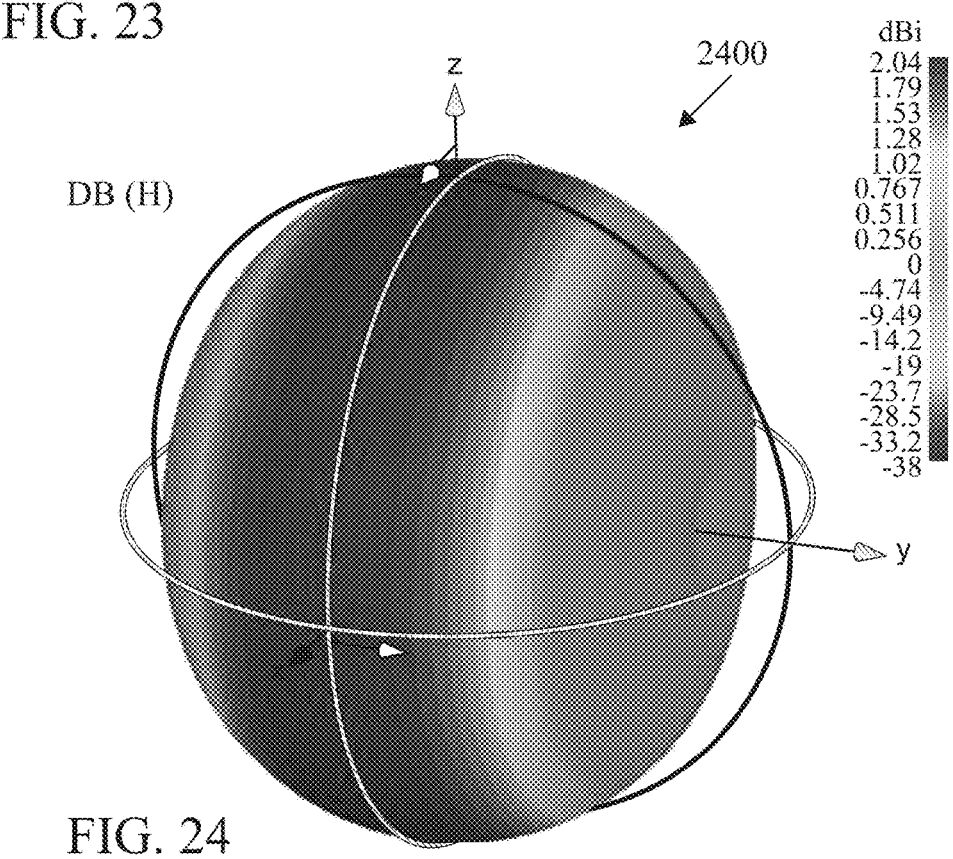
FIG. 24 is an illustration of an antenna pattern at 2400 MHz for the V/V dipoles at a separation d of 18 mm of FIG. 19.
Figure 25:
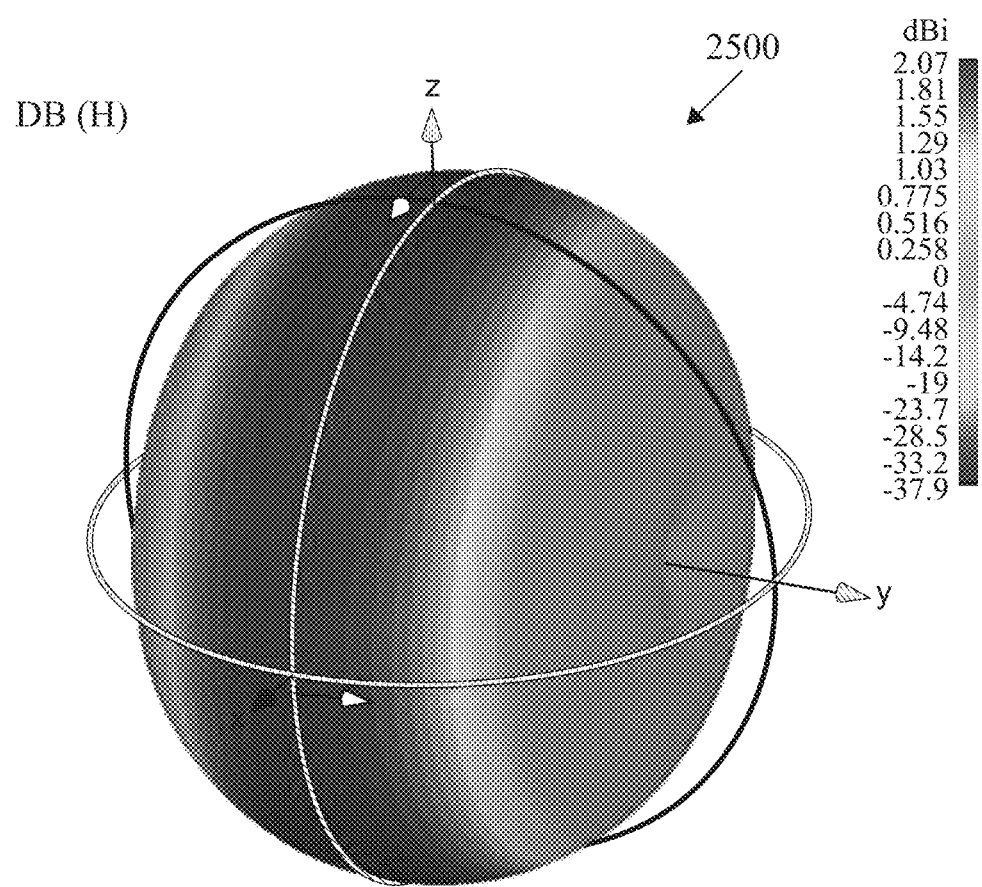
FIG. 25 is an illustration of an antenna pattern at 2400 MHz for the V/V dipoles at a separation d of 0 mm of FIG. 20.

FIG. 23 is an illustration of an antenna pattern 2300 at 2400 MHz for the V/V dipoles at a separation d of 30 mm of FIG. 18. FIG. 24 is an illustration of an antenna pattern 2400 at 2400 MHz for the V/V dipoles at a separation d of 18 mm of FIG. 19. FIG. 25 is an illustration of an antenna pattern 2500 at 2400 MHz for the V/V dipoles at a separation d of 0 mm of FIG. 20. As shown in FIGS. 23-25, because the 5-GHz antennas do not radiate at 2.4 GHz there is no interaction with the DB antennas in the low band and the DB antenna patterns observed are the typical dipole patterns expected.

Figure 32:
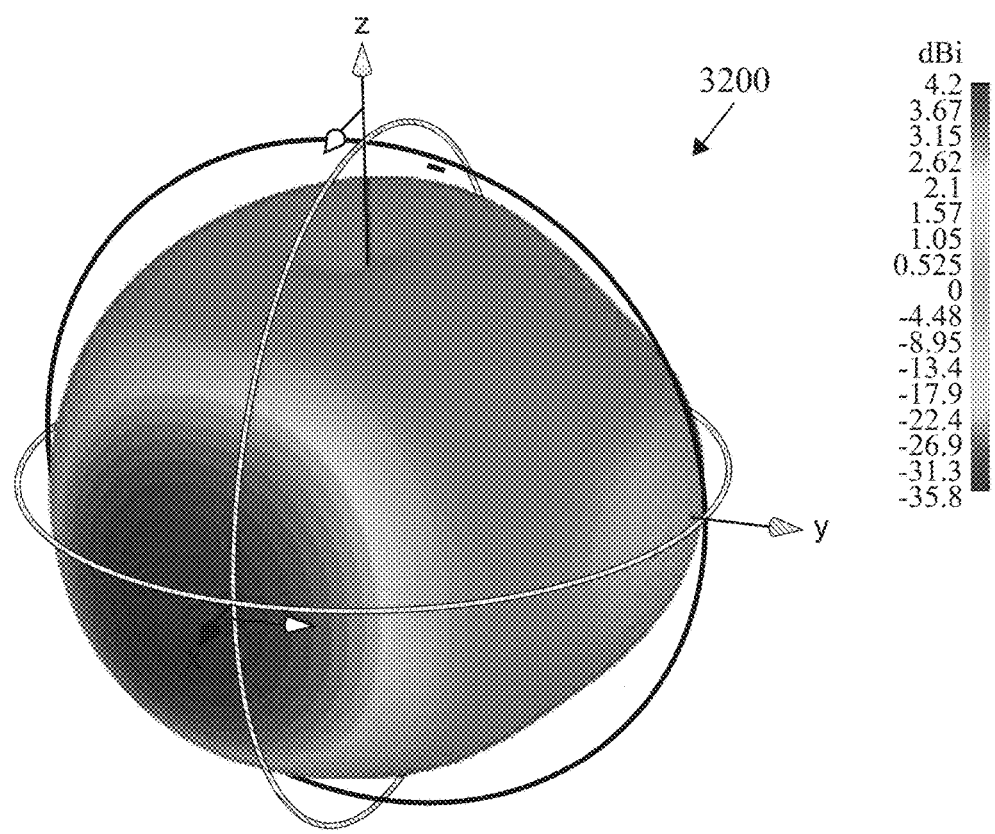
FIG. 32 is an illustration of an antenna pattern at 5500 MHz for the V/V dipoles at a separation d of 30 mm of FIG. 18.
Figure 33:
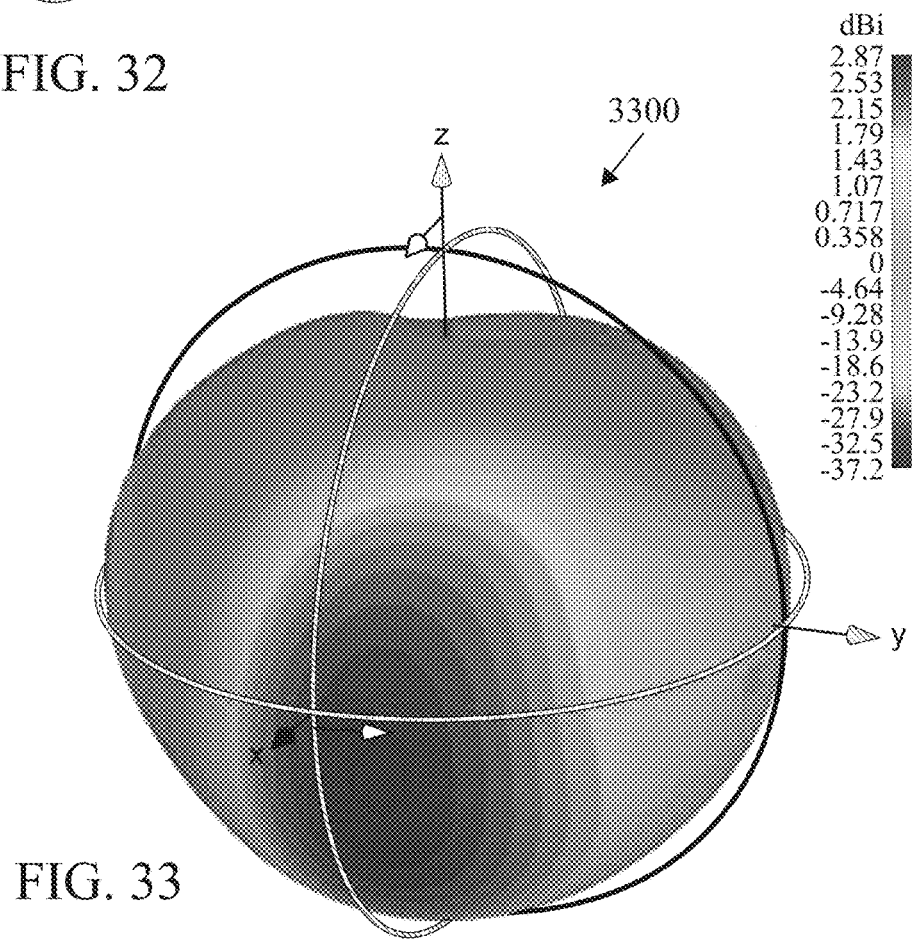
FIG. 33 is an illustration of an antenna pattern at 5500 MHz for the V/V dipoles at a separation d of 30 mm of FIG. 18.
Figure 34:
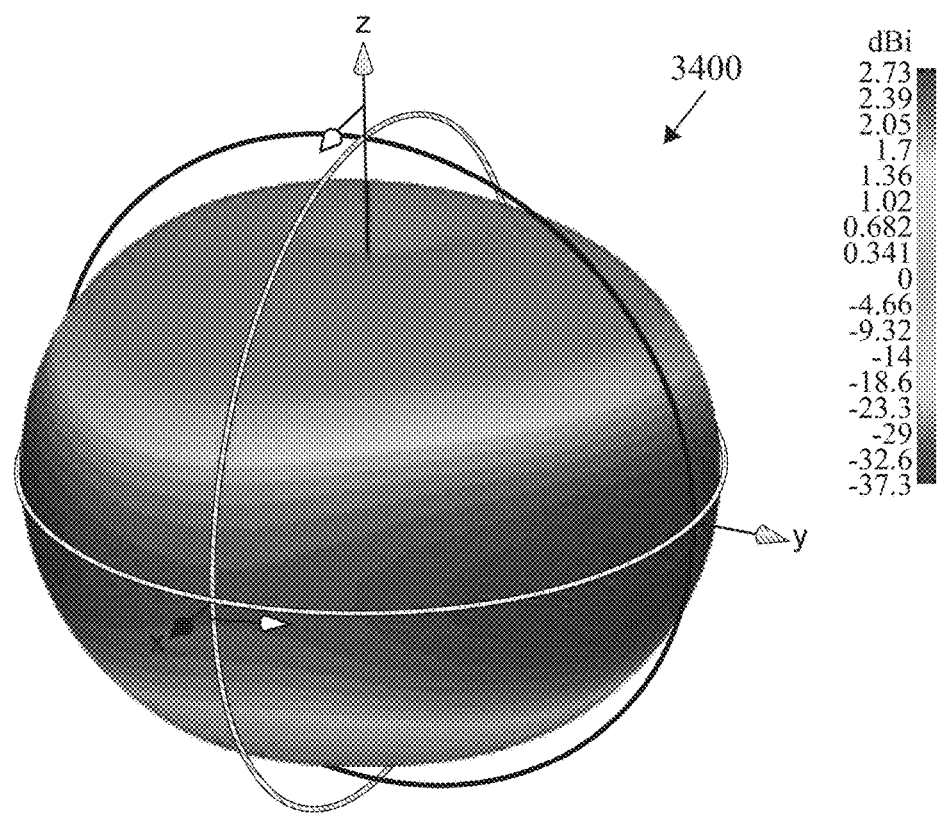
FIG. 34 is an illustration of an antenna pattern at 5500 MHz for the V/H dipoles at a separation d of 18 mm of FIG. 19.
Figure 35:
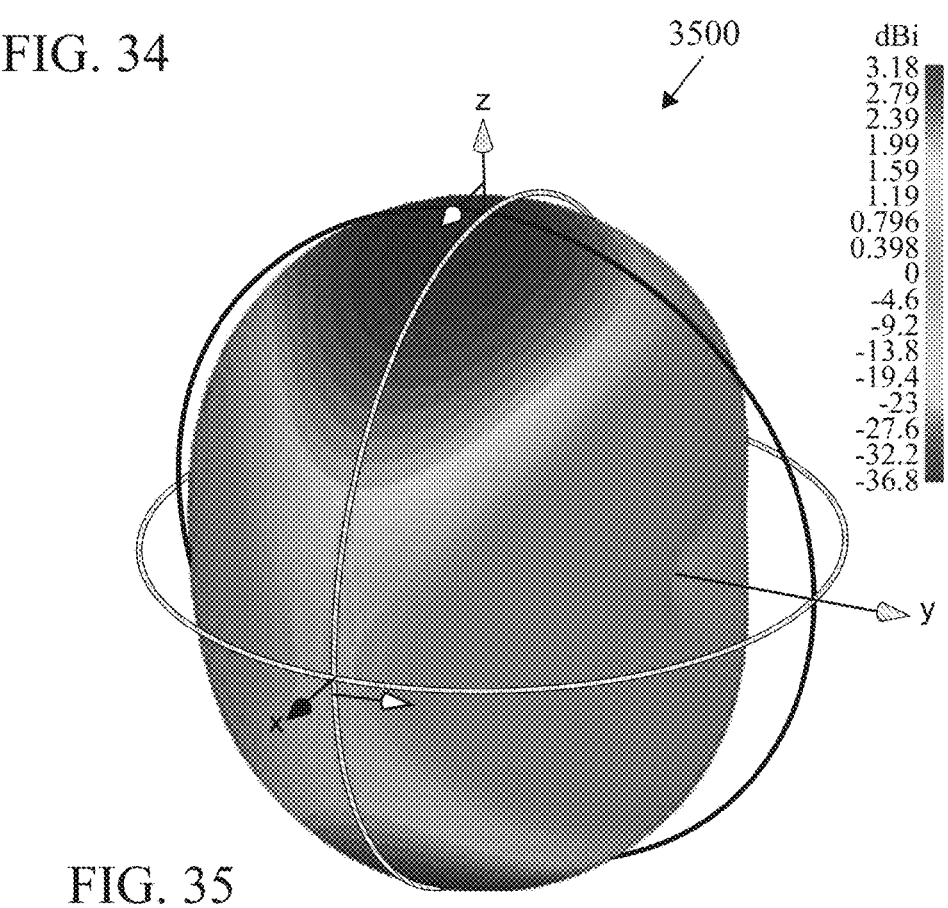
FIG. 35 is an illustration of an antenna pattern at 5500 MHz for the V/H dipoles at a separation d of 18 mm of FIG. 19.
Figure 36:
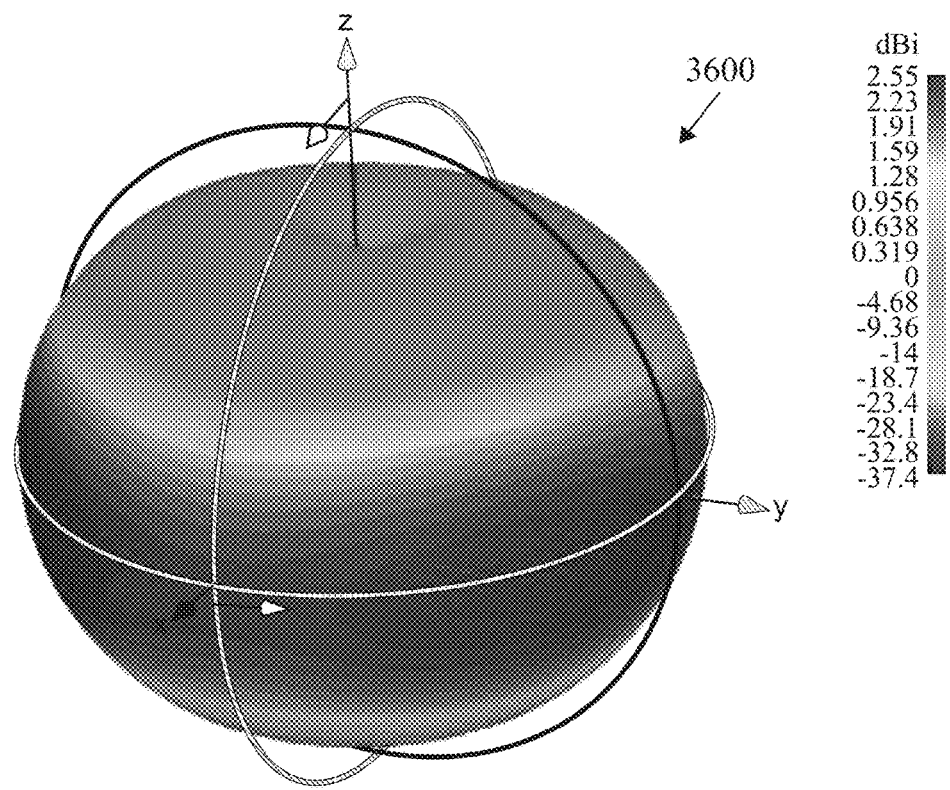
FIG. 36 is an illustration of an antenna pattern at 5500 MHz for the V/H dipoles at a separation d of 0 mm of FIG. 20.
Figure 37:
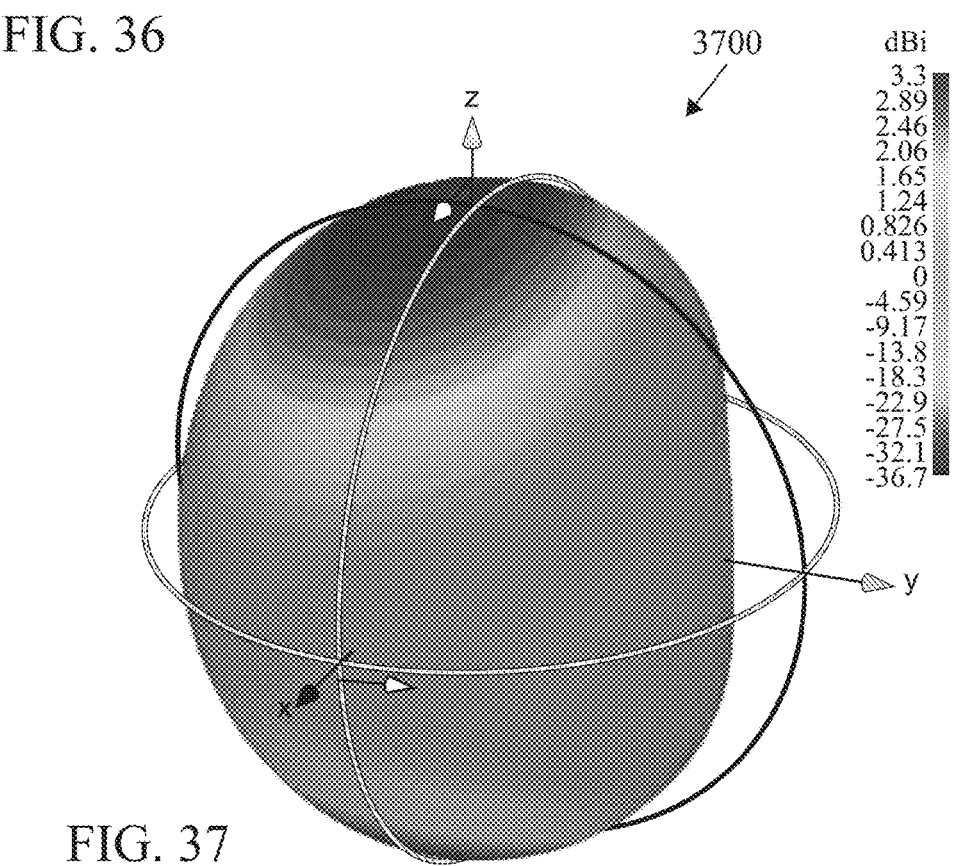
FIG. 37 is an illustration of an antenna pattern at 5500 MHz for the V/H dipoles at a separation d of 0 mm of FIG. 20.

FIG. 32 is an illustration of an antenna pattern 3200 at 5500 MHz for the V/V dipoles at a separation d of 30 mm of FIG. 18. FIG. 33 is an illustration of an antenna pattern 3300 at 5500 MHz for the V/V dipoles at a separation d of 30 mm of FIG. 18. FIG. 34 is an illustration of an antenna pattern 3400 at 5500 MHz for the V/H dipoles at a separation d of 18 mm of FIG. 19. FIG. 35 is an illustration of an antenna pattern 3500 at 5500 MHz for the V/H dipoles at a separation d of 18 mm of FIG. 19. FIG. 36 is an illustration of an antenna pattern 3600 at 5500 MHz for the V/H dipoles at a separation d of 0 mm of FIG. 20. FIG. 37 is an illustration of an antenna pattern 3700 at 5500 MHz for the V/H dipoles at a separation d of 0 mm of FIG. 20. As shown in FIGS. 32-37, in the case of V/V dipoles, the antenna patterns are "deformed" due to the strong coupling between the antennas. In the case of V/H dipoles, both d=18 mm and d=0 mm, the original dipole pattern is preserved to great extent that allows to predict reliably the antenna and the overall system performance.

Figure 26:
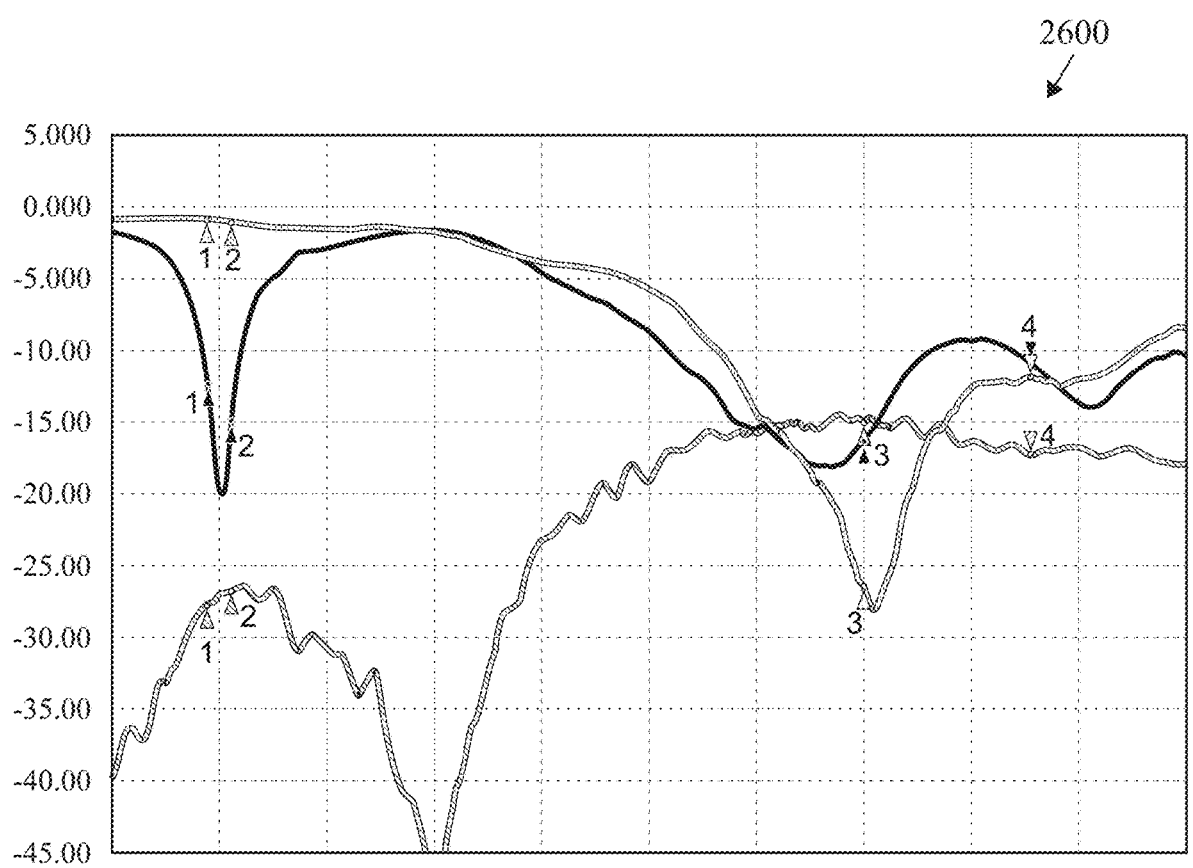
FIG. 26 is a graph of antenna return loss and isolation for the V/V dipoles at a separation d of 30 mm.
Figure 27:
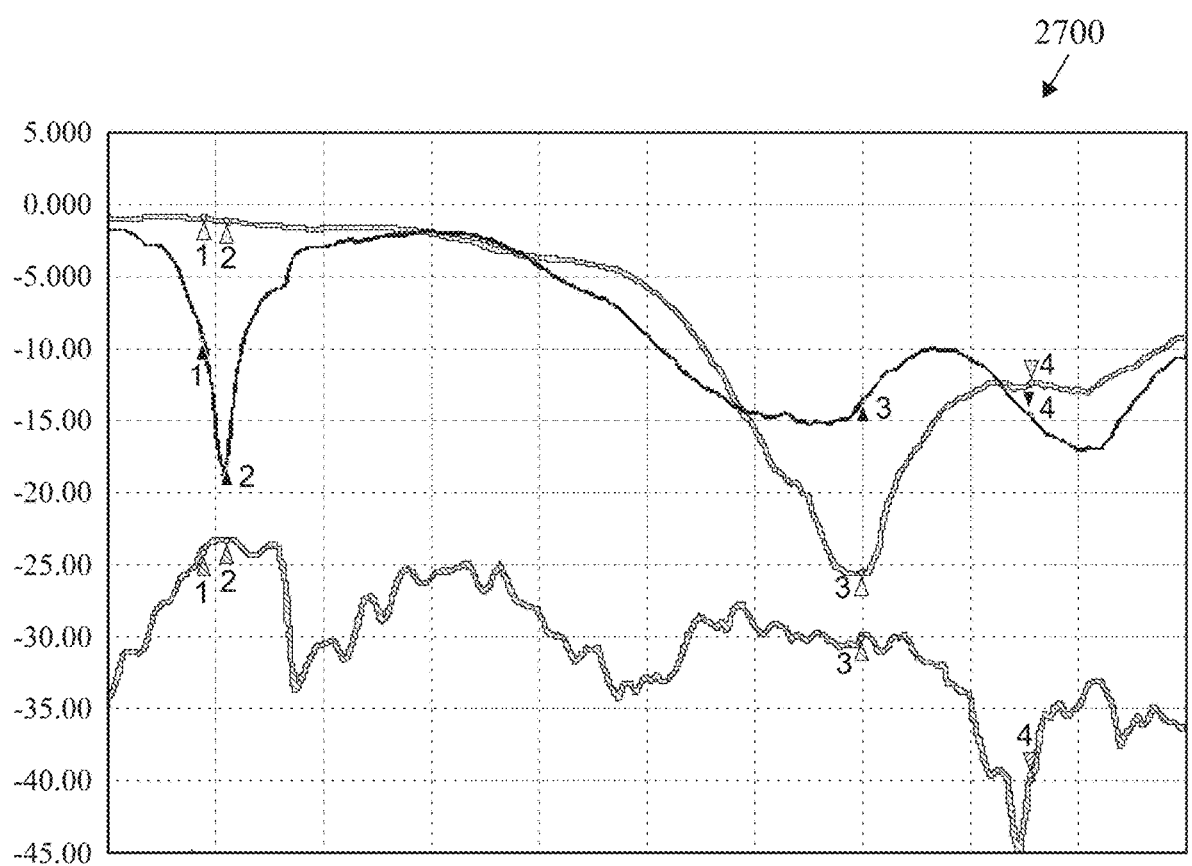
FIG. 27 is a graph of antenna return loss and isolation for the V/H dipoles at a separation d of 18 mm.
Figure 28:
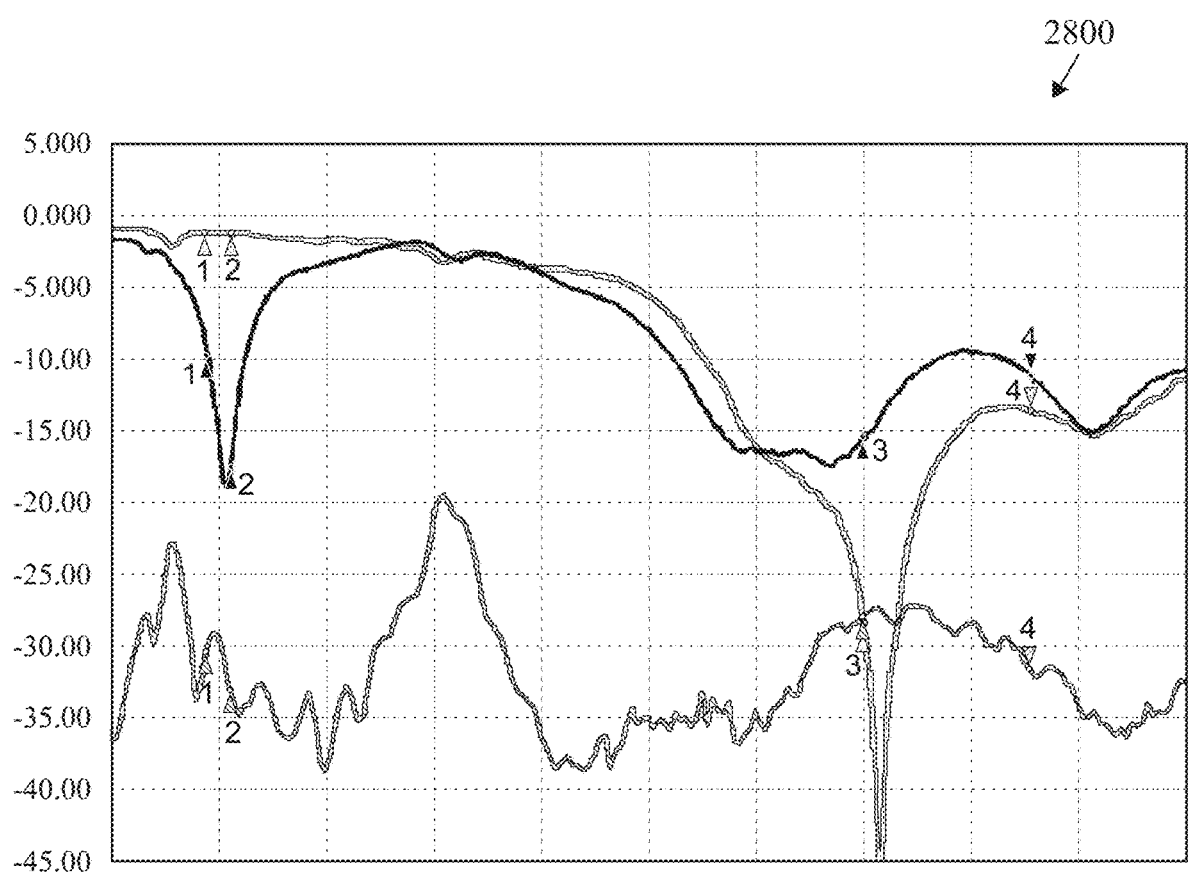
FIG. 28 is a graph of antenna return loss and isolation for the V/H dipoles at a separation d of 0 mm.

Antennas were milled and S-parameter measurements were performed for the same dipole configurations studied in simulations. The antennas are tested with 100-mm long 1.13-mm coaxial cables with UF.L connectors. The antennas were milled as simulated—no further optimization was made. FIG. 26 is a graph 2600 of antenna return loss and isolation for the V/V dipoles at a separation d of 30 mm. FIG. 27 is a graph 2700 of antenna return loss and isolation for the V/H dipoles at a separation d of 18 mm. FIG. 28 is a graph 2800 of antenna return loss and isolation for the V/H dipoles at a separation d of 0 mm. As shown in FIGS. 26-28, measurements with V/V dipole configuration are very close to simulation results. In the case of X-pol dipoles, some deviations from simulations are observed. However, both X-pol dipole configurations show increase of approximately 15 dB in isolation at 5 GHz (which is the critical band) and, thus allows implementing high-order schemes used in 802.11 ax communications.

Figure 29:
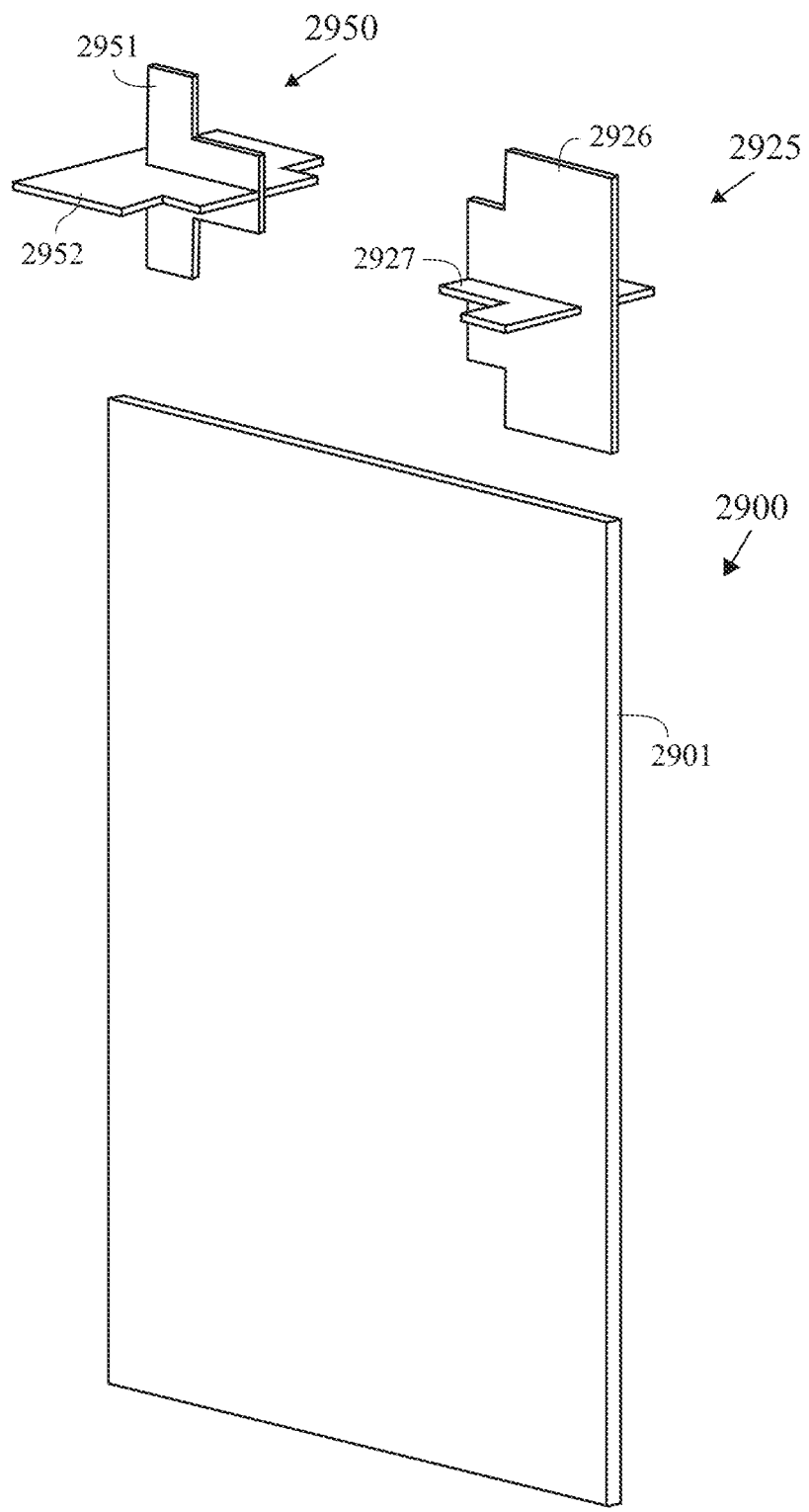
FIG. 29 is an illustration of an antenna system of two V+H dual band antennas and two V+H 5 GHz antennas with an overall dimension of 150 mm×80 mm×40 mm.
Figure 30:
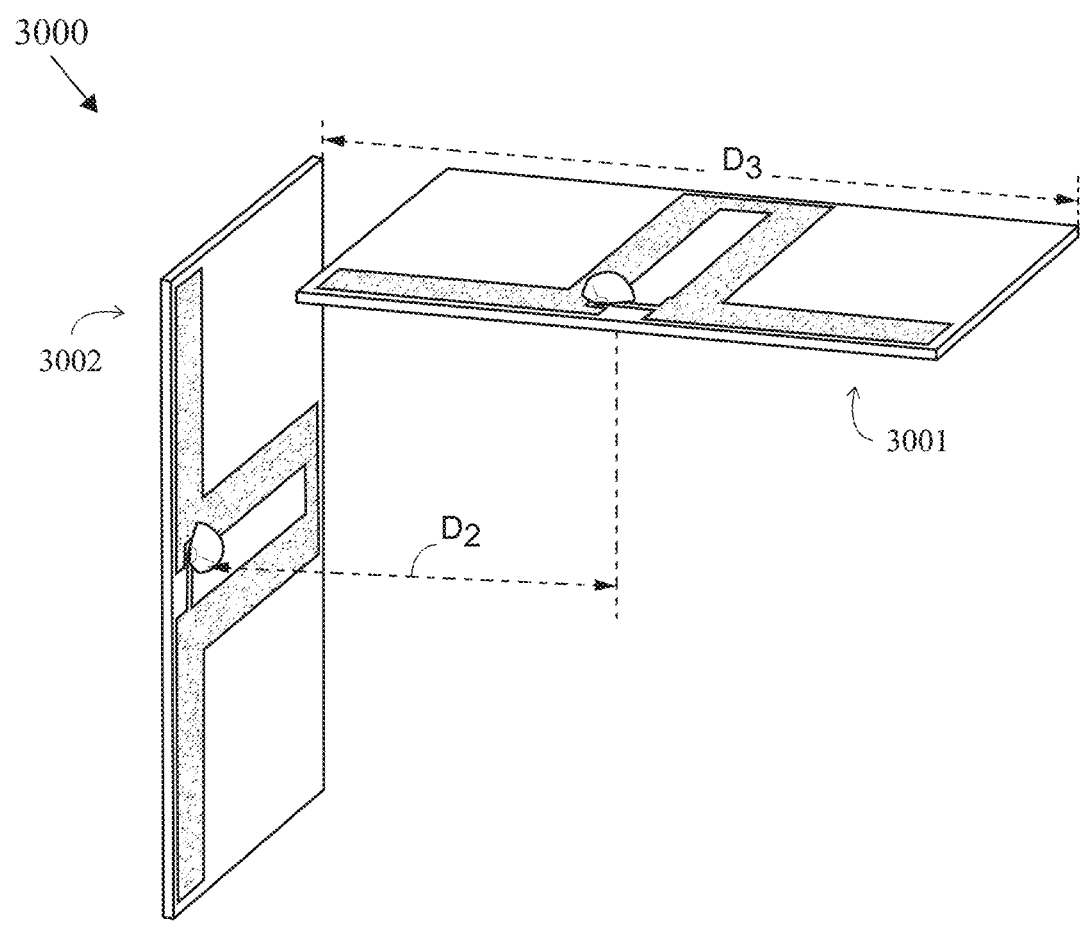
FIG. 30 is an illustration of a second embodiment of a single band 2.4 GHz dipole configuration with V/H dipoles at a separation d of 35 mm.

As shown in FIG. 29, the main advantages of co-located and closely located X-pol dipoles for MIMO applications are due to the small separation between antennas and small volume occupied. The same number of antennas providing the same degree of correlation and isolation can fit in a smaller volume for a possible reduction of the overall device size. For fixed device size, the smaller volume occupied and the small separation between antennas provides more flexibility in choosing antenna locations which is helpful in moving antennas away from non-optimal locations (e.g., large heat-sinks, noise sources, etc.) thereby ensuring better overall device performance. FIG. 29 is a simple illustration of a solution with a first configuration 2950 having two V+H DB antennas 2951 and 2952, a second configuration 2925 having two V+H 5-GHz antennas 2926 and 2927, and a board 2901, with a device having overall dimensions that are 150 mm×80 mm×40 mm.

Figure 31:
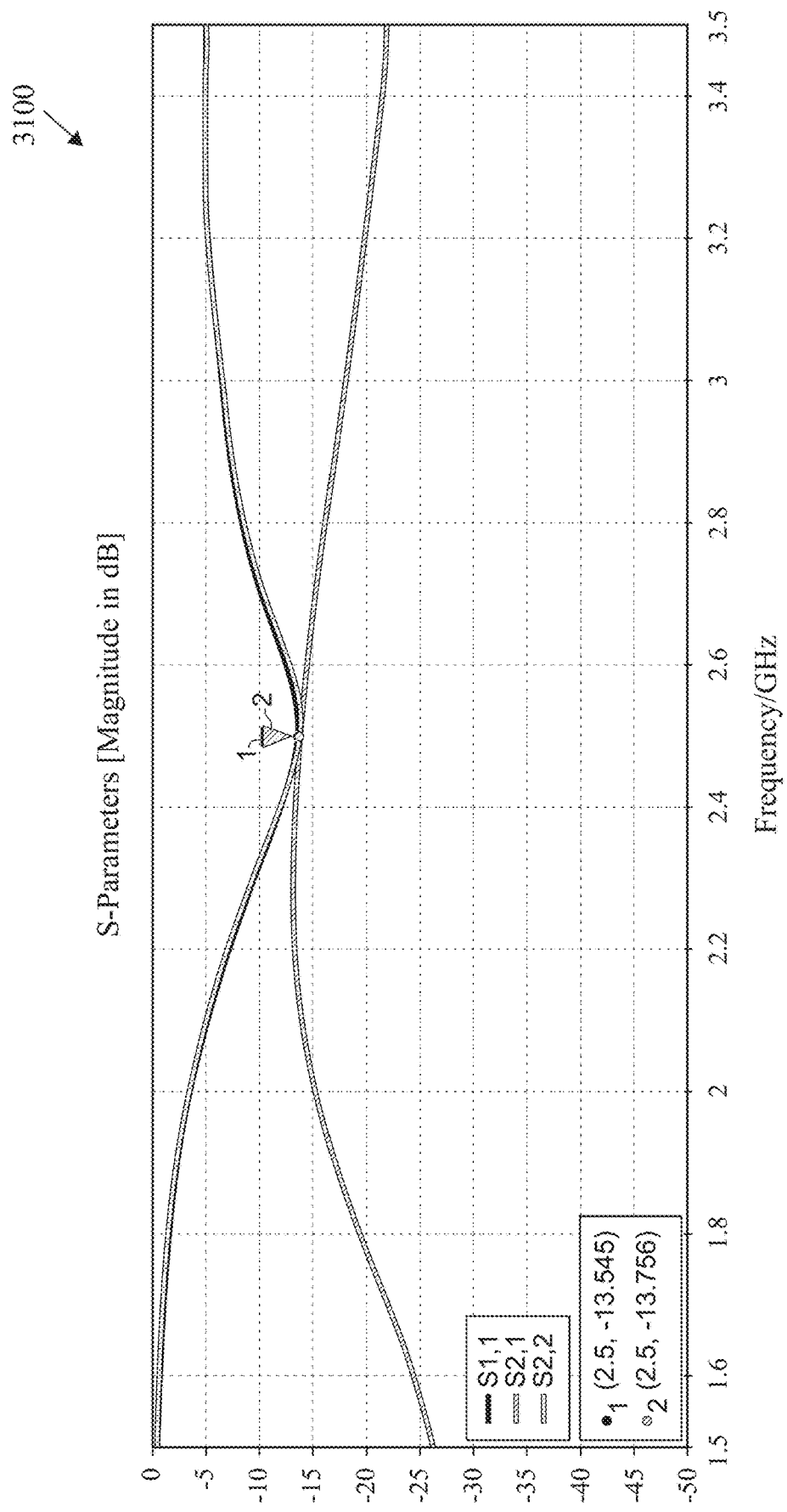
FIG. 31 is a graph of antenna return loss and isolation for the V/H dipoles at a separation d of 35 mm.

FIG. 31 is a graph 3100 of antenna return loss and isolation for the V/H dipoles at a separation d of 35 mm. As shown in FIG. 31, when the X-pol dipoles are positioned in such a way that the second antenna is moved away from the null of the first antenna the isolation between antennas degrades back to the level of V/V dipoles, which should be avoided.

Antennas are selected from the group of antennas consisting of a WiFi 2G antenna, a WiFi 5G antenna, a DECT antenna, a ZigBee antenna and a Zwave antenna. The WiFi 2G antennas are preferably 2400-2690 MegaHertz. The WiFi 5G antenna is preferably a 5.8 GigaHertz antenna. Alternatively, the antenna element operates at 5.15 GHz or at 5.85 GHz. Other possible frequencies for the second antenna element 43 include 5150 MHz, 5200 MHz, 5300 MHz, 5400 MHz, 5500 MHz, 5600 MHz, 5700 MHz, 5850 MHz, and 2.4 GHz. The antenna element preferably operates on an 802.11 communication protocol. Most preferably, the antenna element operates on an 802.11n communication protocol. Alternatively, the antenna element operates on an 802.11b communication protocol. Alternatively, the antenna element operates on an 802.11g communication protocol. Alternatively, the antenna element operates on an 802.11a communication protocol. Alternatively, the antenna element operates on an 802.11ac communication protocol.

For WiFi multi-antenna devices, the present invention covers both 2.4 GHz and 5 GHz bands, omnidirectional like a vertical dipole but with polarization that is horizontal. The present invention is preferably designed for production using printed circuit board. The present invention preferably covers two bands, one low as in 2.4 to 2.49 GHz (2G band), one high as in 5.15 to 5.85 GHz (5G band), both with omni horizontal polarization.

Thill, U.S. patent Ser. No. 10/109,918 for a Multi-Element Antenna For Multiple bands Of Operation And Method Therefor, is hereby incorporated by reference in tis entirety.

He, U.S. Pat. No. 9,362,621 for a Multi-Band LTE Antenna is hereby incorporated by reference in its entirety.

Abramov et al., U.S. Pat. No. 7,215,296 for a Switch Multi-Beam Antenna Serial is hereby incorporated by reference in its entirety.

Salo et al., U.S. Pat. No. 7,907,971 for an Optimized Directional Antenna System is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 8,423,084 for a Method for radio communication in a wireless local area network and transceiving device is hereby incorporated by reference in its entirety.

Khitrik et al., U.S. Pat. No. 7,336,959 for an Information transmission method for a wireless local network is hereby incorporated by reference in its entirety.

Khitrik et al., U.S. Pat. No. 7,043,252 for an Information transmission method for a wireless local network is hereby incorporated by reference in its entirety.

Abramov et al., U.S. Pat. No. 8,184,601 for a METHOD FOR RADIO COMMUNICATION IN A WIRELESS LOCAL AREA NETWORK WIRELESS LOCAL AREA NETWORK AND TRANSCEIVING DEVICE is hereby incorporated by reference in its entirety.

Abramov et al., U.S. Pat. No. 7,627,300 for a Dynamically optimized smart antenna system is hereby incorporated by reference in its entirety.

Abramov et al., U.S. Pat. No. 6,486,832 for a Direction-agile antenna system for wireless communications is hereby incorporated by reference in its entirety.

Yang, U.S. Pat. No. 8,081,123 for a COMPACT MULTI-LEVEL ANTENNA WITH PHASE SHIFT is hereby incorporated by reference in its entirety.

Nagaev et al., U.S. Pat. No. 7,292,201 for a Directional antenna system with multi-use elements is hereby incorporated by reference in its entirety.

Abramov et al., U.S. Pat. No. 7,696,948 for a Configurable directional antenna is hereby incorporated by reference in its entirety.

Abramov et al., U.S. Pat. No. 7,965,242 for a Dual-band antenna is hereby incorporated by reference in its entirety.

Abramov et al., U.S. Pat. No. 7,729,662 for a Radio communication method in a wireless local network is hereby incorporated by reference in its entirety.

Abramov et al., U.S. Pat. No. 8,248,970 for an OPTIMIZED DIRECTIONAL MIMO ANTENNA SYSTEM is hereby incorporated by reference in its entirety.

Visuri et al., U.S. Pat. No. 8,175,036 for a MULTIMEDIA WIRELESS DISTRIBUTION SYSTEMS AND METHODS is hereby incorporated by reference in its entirety.

Yang, U.S. Patent Publication Number 20110235755 for an MIMO Radio System With Antenna Signal Combiner is hereby incorporated by reference in its entirety.

Yang et al., U.S. Pat. No. 9,013,355 for an L SHAPED FEED AS PART OF A MATCHING NETWORK FOR A MICROSTRIP ANTENNA is hereby incorporated by reference in its entirety.

Iellici, U.S. patent Ser. No. 10/305,182 for a Balanced Antenna is hereby incorporated by reference in its entirety.

He et al., U.S. patent Ser. No. 10/164,324 for Antenna Placement Topologies For Wireless Network System Throughputs Improvement is hereby incorporated by reference in its entirety.

Yang, U.S. Pat. No. 9,912,043 for an Antenna System For A Large Appliance is hereby incorporated by reference in its entirety.

Thill et al., U.S. Pat. No. 8,669,903 for a Dual Frequency Band Communication Antenna Assembly Having AN Inverted F Radiating Element is hereby incorporated by reference in its entirety.

Thill et al., U.S. Pat. No. 6,850,191 for a Dual Frequency Band Communication Antenna is hereby incorporated by reference in its entirety.

Thill et al., U.S. Pat. No. 6,087,990 for a Dual Function Communication Antenna is hereby incorporated by reference in its entirety.

Thill, U.S. patent Ser. No. 10/511,086 for an Antenna Assembly For A Vehicle is hereby incorporated by reference in its entirety.

He et al., U.S. patent application Ser. No. 16/379,767, filed on Apr. 9, 2019, for a 5G Broadband Antenna is hereby incorporated by reference in its entirety.

Montgomery, U.S. patent application Ser. No. 16/729,233, filed on Dec. 27, 2019, for a Dual Band Horizontally Polarized Omnidirectional Antenna, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. An antenna system with co-located dipoles with mutually-orthogonal polarization, the antenna system comprising:
a vertical dipole antenna comprising a dielectric substrate, a plurality of dipole arms, an antenna balun, a metallization section and a feed point;
a horizontal dipole antenna comprising a dielectric substrate, a plurality of dipole arms, an antenna balun, a metallization section and a feed point;
wherein the vertical antenna and the horizontal antenna are co-located in two mutually-orthogonal planes;
wherein a first dipole arm of the plurality of dipole arms of the vertical dipole antenna is located on one side of the horizontal dipole antenna and a second dipole arm of the plurality of dipole arms of the vertical dipole antenna is located on an opposing side of the horizontal dipole antenna;
wherein a first dipole arm of the plurality of dipole arms of the horizontal dipole antenna is located on one side of the vertical dipole antenna and a second dipole arm of the plurality of dipole arms of the horizontal dipole antenna is located on an opposing side of the vertical dipole antenna;
wherein the antenna balun of the vertical dipole antenna engages the antenna balun of the horizontal dipole antenna.

2. The antenna system according to claim 1 wherein the two antennas operate in the same wireless communications band or in different bands.

3. The antenna system according to claim 1 wherein the two antennas are fed via coaxial cables or via transmission lines.

4. The antenna system according to claim 1 wherein the two antennas are made of metallization on dielectric substrates of a sheet metal.

5. The antenna system according to claim 1 wherein the location of the first antenna and the second antenna in two mutually-orthogonal planes provides an antenna solution for wireless communications with high isolation between the first antenna and the second antenna, and polarization diversity in a minimum volume occupied.

6. An antenna system for multiple-input-multiple-output (MIMO) communication, the antenna system comprising:
a first dipole antenna comprising a dielectric substrate, a plurality of dipole arms, an antenna balun, a metallization section and a feed point; and
a second dipole antenna comprising a dielectric substrate, a plurality of dipole arms, an antenna balun, a metallization section and a feed point;
wherein the first dipole antenna and the second dipole antenna are co-located with mutually-orthogonal polarization,
wherein a first dipole arm of the plurality of dipole arms of the first dipole antenna is located on one side of the second dipole antenna and a second dipole arm of the plurality of dipole arms of the first dipole antenna is located on an opposing side of the second dipole antenna;

wherein a first dipole arm of the plurality of dipole arms of the second dipole antenna is located on one side of the first dipole antenna and a second dipole arm of the plurality of dipole arms of the second dipole antenna is located on an opposing side of the first dipole antenna;

wherein the antenna balun of the first dipole antenna engages the antenna balun of the second dipole antenna.

7. The antenna system according to claim 6 wherein the first dipole antenna lies in a horizontal plane and the second dipole antenna lies in a vertical plane extending outward from the first dipole antenna.

8. The antenna system according to claim 7 wherein the first dipole antenna operates in a first communication band ranging from 2.4 to 2.49 GigaHertz (GHz), and the second dipole antenna operates in a second communication band ranging from 5.15 to 5.85 GHz.

9. The antenna system according to claim 7 wherein the first dipole antenna operates in a first communication band ranging from 2.4 to 2.49 GHz, and the second dipole antenna operates in a second communication band ranging from 2.4 to 2.49 GHz.

10. The antenna system according to claim 7 wherein the first dipole antenna operates in a first communication band ranging from 5.15 to 5.85 GHz, and the second dipole antenna operates in a second communication band ranging from 5.15 to 5.85 GHz.

11. The antenna system according to claim 7 wherein the first dipole antenna operates in a first communication band ranging from 5.15 to 5.85 GHz, and the second dipole antenna operates in a second communication band ranging from 2.4 to 2.49 GHz.

* * * * *